United States Patent [19]

Uesugi

[11] Patent Number: 4,484,277
[45] Date of Patent: Nov. 20, 1984

[54] ELECTRONIC CASH REGISTER HAVING SELECTIVE READOUT

[75] Inventor: Yoshinori Uesugi, Tokyo, Japan

[73] Assignee: Casio Computer Co., Ltd., Tokyo, Japan

[21] Appl. No.: 536,626

[22] Filed: Sep. 26, 1983

Related U.S. Application Data

[63] Continuation of Ser. No. 278,417, Jun. 29, 1981.

[30] Foreign Application Priority Data

| Jul. 4, 1980 [JP] | Japan | 55-90726 |
| Jul. 4, 1980 [JP] | Japan | 55-90727 |
| Jul. 8, 1980 [JP] | Japan | 55-92215 |
| Jul. 8, 1980 [JP] | Japan | 55-92216 |
| Jul. 16, 1980 [JP] | Japan | 55-96173 |
| Aug. 1, 1980 [JP] | Japan | 55-105949 |
| Aug. 1, 1980 [JP] | Japan | 55-105950 |

[51] Int. Cl.³ .......................................... G06F 15/20
[52] U.S. Cl. ..................................... 364/405; 364/900
[58] Field of Search ............. 364/405, 200 MS File, 364/900 MS File

[56] References Cited

U.S. PATENT DOCUMENTS

| 3,806,711 | 4/1974 | Cousins, Jr. | 364/405 |
| 3,914,579 | 10/1975 | Shigemori et al. | 364/405 |
| 4,138,733 | 2/1979 | Tadakuma et al. | 364/405 |
| 4,142,235 | 2/1979 | Tadakuma et al. | 364/405 |
| 4,159,533 | 6/1979 | Sakurai | 364/900 |
| 4,186,439 | 1/1980 | Shimura et al. | 364/405 |
| 4,213,179 | 7/1980 | Hamano et al. | 364/405 |
| 4,293,911 | 10/1981 | Oonishi | 364/405 |
| 4,312,037 | 1/1982 | Yamakita | 364/405 |
| 4,319,326 | 3/1982 | Uchida | 364/405 |
| 4,322,796 | 3/1982 | Uchida et al. | 364/405 |
| 4,360,872 | 11/1982 | Suzuki et al. | 364/405 |

FOREIGN PATENT DOCUMENTS

| 1318452 | 5/1973 | United Kingdom . |
| 1410357 | 10/1975 | United Kingdom . |
| 1439528 | 6/1976 | United Kingdom . |
| 1442591 | 7/1976 | United Kingdom . |
| 1499704 | 2/1978 | United Kingdom . |
| 1530444 | 11/1978 | United Kingdom . |
| 1594239 | 7/1981 | United Kingdom . |

Primary Examiner—Joseph F. Ruggiero
Assistant Examiner—Gary V. Harkcom
Attorney, Agent, or Firm—Frishauf, Holtz, Goodman and Woodward

[57] ABSTRACT

An electronic cash register for printing designated data includes a keyboard having a plurality of keys. The keyboard has a switch for designating a write-in mode and a read-out mode and a plurality of keys including ten keys, function keys, etc. The data coupled by the operation of these keys are stored in the journal memory. The data to be read out in the read mode are stored in a register included in a CPU. The CPU performs a comparison of the data from the journal memory and the designated data read out from the register in the CPU in its calculating section and, when the compared data coincide, the read-out designated data are output for display in a display section or printing in a printing section.

4 Claims, 33 Drawing Figures

FIG. 4

| KEY | CODE | MNE-MONIC | KEY | CODE | MNE-MONIC | DATA | CODE | MNE-MONIC |
|---|---|---|---|---|---|---|---|---|
| 0 | 0 | 0 | NS | E0 | [NS] | DATE | F0 | [DA] |
| 1 | 1 | 1 | CA/AMT TEND | E1 | [CA] | A | F1 | [A] |
| 2 | 2 | 2 | Cr | E2 | [CR] | B | F2 | [B] |
| 3 | 3 | 3 | ch | E3 | [CH] | C | F3 | [C] |
| 4 | 4 | 4 | RC | E4 | [RC] | D | F4 | [D] |
| 5 | 5 | 5 | Pd | E5 | [PD] | E | F5 | [E] |
| 6 | 6 | 6 | Tx | E6 | [TX] | F | F6 | [F] |
| 7 | 7 | 7 | ST | E7 | [ST] | NO | F7 | [NO] |
| 8 | 8 | 8 | NO Tx | E8 | [NT] | REG | F8 | [REG] |
| 9 | 9 | 9 | X | E9 | [X] | REF | F9 | [REF] |
| 01 | A | [01] | V | EA | [VD] | SET | FA | [SET] |
| 02 | B | [02] | % | EB | [%] | TIME | FB | [TM] |
| 03 | C | [03] | + | EC | [+] |  | FC | [PW] |
| 04 | D | [04] | − | ED | [−] | END | FD | [END] |

RECEIPT OF POWER

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 8 | 0 | 0 | 6 | 1 | 0 | DA | REG | A | 1 | 2 | 3 | O |
| 1 | 1 | 4 | 5 | 6 | 02 | VD | 5 | 4 | 6 | 02 | 1 | 0 | % |
| 2 |   | — | 7 | 0 | 0 | CA | 0 | 8 | 1 | 5 | TM | B |
| 3 | 7 | 8 | 9 | 03 | 1 | 0 | 0 | 01 | 1 | 0 | TX | 9 | 7 |
| 4 | 8 | CH | 0 | 8 | 2 | 0 | TM | A | 4 | 5 | 6 | 02 |
| 5 | 7 | 8 | 8 | 03 | VD | 1 | 2 | 3 | 01 | 1 | 5 | % |
| 6 | — | 6 | 0 | 0 | CA | 0 | 8 | 2 | 4 | TM | 5 | X |
| 7 | 1 | 2 | 3 | 01 | 1 | 5 | — | 1 | 2 | 3 | 4 | 5 | 02 |
| 8 | CR | 0 | 8 | 2 | 9 | TM | B | 7 | 8 | 9 | 03 | 1 |
| 9 | 0 | 0 | 0 | AT | 0 | 8 | 3 | 7 | TM | 1 | 5 | 0 | 0 | R |
| 10 | C | 0 | 8 | 4 | 1 | TM | REF | 1 | 0 | 0 | 01 | CA |
| 11 | 0 | 8 | 4 | 5 | TM | END |

FIG. 11

```
-----REF
01   ·100
       100 ST
 B NO 7
       9:50
02   ·150
01   ·270
       420 ST
 A NO 19
       10:16
```
```
 A NO 3
       798
 B NO 2
       520
 C NO 4
       790
   NO 9
       2108 CA
       15:17
```

FIG. 13

```
 B -----
03   ·789
01   ·100
       10 Tx
       ·978 Ch
 B NO 2
       9:56
03   1789
       ·1000
       ·211 Ca
 B NO 5
       11:56
```
⟵ AMT TEND
```
   NO 23
       ·45346 CA
   NO 7
       3752 Ch
   NO 2
       5116 Cr
       17:51
```

FIG. 16A

```
          ----CA
01    ·123
02    ·456
02    ·456V
02    ·546
  %     10
      ·55-
     ·614ST
      ·700 ──── AMT
        86 ──── TEND
 A  NO 1      ── CHANGE
     8:15
02    ·456
03    ·288V
01    ·123
  %     15
      ·18-
     ·516ST
      ·600 ──── AMT
       ·84 ──── TEND
 A  NO 3      ── CHANGE
     8:20
       )
       (
     NO 45
    ·29875
     17:19
```

| 1 | 0 | 0 | 0 | 0 | Cr |

| 5 | 0 | 0 | Ch |

```
-----500Ch
03   ·789
01   ·100
      10Tx
    ·978Ch
 B NO   2
    9 56

NO  11
    ·7848
    17:48
```

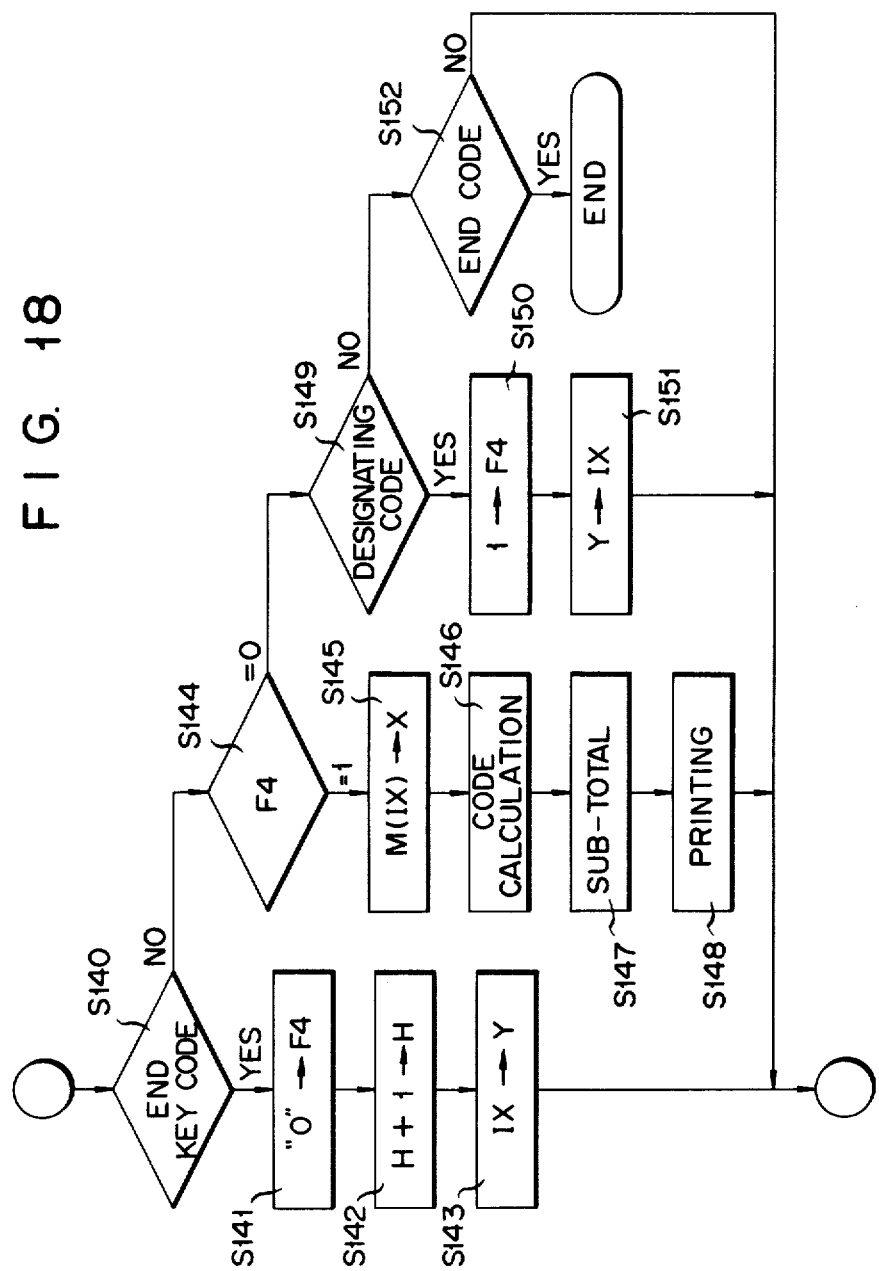
F I G. 18

F I G. 19A  [o] [v]

```
        ----O V
01    .123
02    .456
02    .456V
02    .546
  %     10
       55-
     614CA
A NO   1
    8:35
02    .456
03    .788
03    .788V
01    .123
  %     15
      .18-
     .516CA
A NO   3
   10:12
~~~~~~~~~~
   17:38
```

F I G. 19B  [o] [Tx]

```
        ----OTx
03    .789
01    .100
       10Tx
      .978Ch
B NO   2
    9:56
~~~~~~~~~~
   17:40
```

F I G. 22A [v]

```
           ---V
02    ·456
  A NO   1
03    ·788
  A NO   3
     ⋮
  NO  17
     ·2534 V─┐
  17:15      └TOTAL
```

F I G. 22B [-]

```
           ---
          ·55
  A NO   1
          ·18
  A NO   3
          ·15
  A NO   4
     ⋮
  NO  23
        435-─┐
  17:18      └TOTAL
```

FIG. 23A

| 1 | 0 | 0 | 0 | 0 | 01 |

| 5 | 0 | 0 | V |

ELECTRONIC CASH REGISTER HAVING SELECTIVE READOUT

This application is a continuation of application Ser. No. 278,417, filed June 29, 1981.

BACKGROUND OF THE INVENTION

This invention relates to an electronic cash register which can print only specified data of a kind among different kinds of stored data.

In the usual electronic cash register, the sales data are printed on a receipt sheet and also on a journal sheet. The receipt sheet is given to the customer, while the journal sheet is stored as a business record. While all the sales data are recorded successively on the journal sheet in the order of their registration, there sometimes arises a case when it is desired to check only particular data among the registered data for such purposes as analysis or reference. The conceivable cases when it is desired to check only particular data are, for instance, a case when it is desired to check only the specific mode data among data for various modes, a case when it is desired to check only the registered data keyed in by a particular clerk-in-charge among the data keyed in by a plurality of clerks-in-charge and a case when it is desired to check only data for a particular kind of transaction, for instance credit sales data. Also, there are cases when it is desired to check a group of sales data including particular data such as data corresponding to the operation of, for instance, a verification key for one customer among the sales data for a number of customers, or when it is desired to check particular data, for instance verified data, among a plurality of different kinds of registered data. Further, there are cases when it is desired to provide only the data for a particular customer defined by registration end data among a series of registered data or when the time zone when the ordinary keying operation is made is interrupted by a bargain sale time zone, during which bargain sales data are registered in accordance with the operation of the corresponding key, and is recovered so that the ordinary key operation is made again, both the ordinary data and bargain sales data are printed on a journal sheet without discrimination. In such cases, only the bargain sales data may sometimes be wanted for the purpose of checking. However, since all the sales data are successively printed as they are keyed in, the extraction of only particular data as those mentioned above requires extravagant checking of a great deal of successive data registered in the journal sheet. That is, it takes a long time for finding out only particular data for the purpose of checking, and also there is a great likelihood that some of data are missed.

The object of the invention is to provide an apparatus for printing designated data, in which data coupled by a keying operation are successively stored, and only designated data among the input data can be read out and printed

SUMMARY OF THE INVENTION

According to the present invention, an electronic cash register comprises a keyboard having amount keys, department keys, function keys and transaction keys; first memory means coupled to the keyboard for causing sales data inputted by the operation of the keys and key code data representing the kinds of the operated keys to be sequentially stored in the order in which these keys are operated; and a central processing unit coupled to the first memory means and including second memory means for storing read-out designation data inputted by the operation of the keys on the keyboard. The central processing unit includes means responsive to the effecting of a read-out designation for determining whether or not the key code data sequentially read out of the first memory means is data which is represented by the read-out designation data stored in the second memory means. Printing means is coupled to the central processing unit for sequentially printing, out of those key code data sequentially read out of the first memory means, only data which is represented by the read-out designation data.

With the above construction according to the invention, it is possible to provide an apparatus for printing designated data, with which only designated data among a plurality of different kinds of data coupled by a keying operation, can be extracted for display or printing so that the period required for checking can be greatly reduced.

BRIEF DESCRIPTION OF THE DRAWINGS

FIG. 4 is a view showing a correspondence relation between codes for individual keys and their mnemonic symbols;

FIG. 11 is a view showing a receipt produced by the operation according to the flow chart shown in FIG. 10;

FIG. 13 is a view showing the data printed on a receipt produced according to the flow chart shown in FIG. 12;

FIGS. 16A and 16B are views showing data printed on receipts produced according to the flow chart shown in FIG. 14;

FIGS. 17A and 17B are views showing data printed on receipts produced according to the flow chart shown in FIG. 15;

FIG. 18 is a view showing a flow chart illustrating an operation, in which particular data, for instance a group of sales data including data based upon the operation of a verification key, among the sales data for a number of customers registered in the electronic cash register and checked;

FIGS. 19A and 19B are views showing data printed on receipts produced according to the flow chart shown in FIG. 18;

FIGS. 22A and 22B are views showing data printed on receipts produced according to the flow chart shown in FIG. 20;

FIGS. 23A and 23B are data printed on receipts produced according to the flow chart shown in FIG. 21;

FIG. 25 is a view showing the order of operation of keys in an operation, in which only the sales data in a bargain sale time zone among the data registered in the electronic cash register are checked;

FIG. 26 is a view showing data stored in a journal memory shown in FIG. 2 by the keying operation shown in FIG. 26.

DETAILED DESCRIPTION

Figure 1:
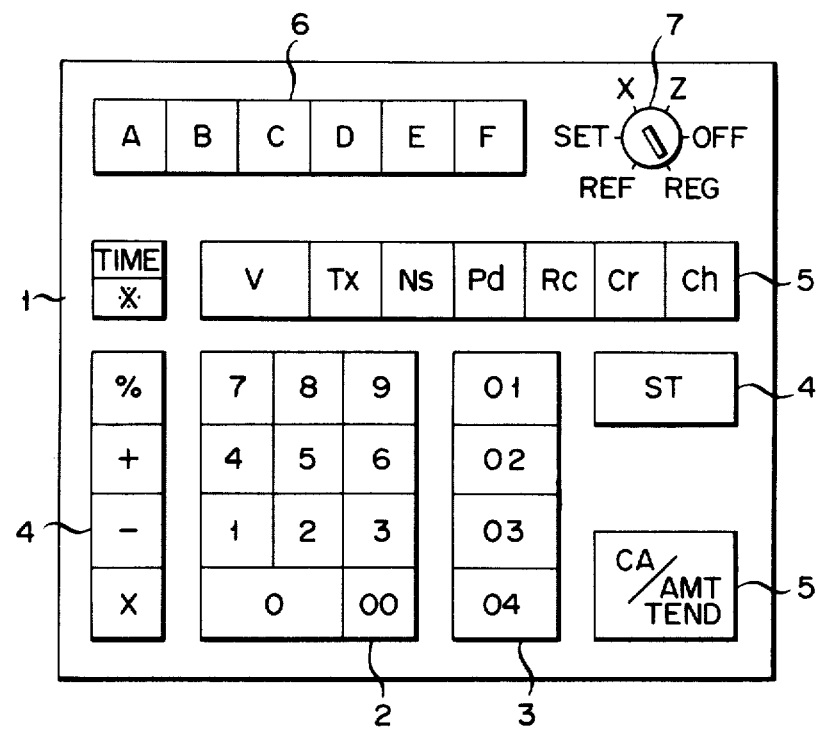
FIG. 1 is a plan view showing the arrangement of keys of an input section of an electronic cash register to which the invention is applied.

FIG. 1 shows an input section 1 of an electronic cash register. This section amount keys 2, namely "0", "00" and "1" to "9" amount keys, department keys 3, namely department "01" to "04" keys, function keys 4, namely PERCENT [%], PLUS [+], MINUS [−], MULTIPLY [X], [TIME], VERIFICATION [V], TX (Tax), NO SALES [NS], SUB-TOTAL [ST], and MARK [•] keys, transaction keys 5, such as PAID-OUT [Pd], RECEIVED [Rc], CREDIT [Cr], CHARGE [Ch] and [CA/AMT TEND] keys and clerk-in-charge keys 6, namely [A] to [F] keys and a mode switch 7 for specifying either "OFF", "REG" (registering operation), "REF" (refund operation), "SET" (setting operation), "X" (read operation) or "Z" (reset operation) mode.

Figure 2:
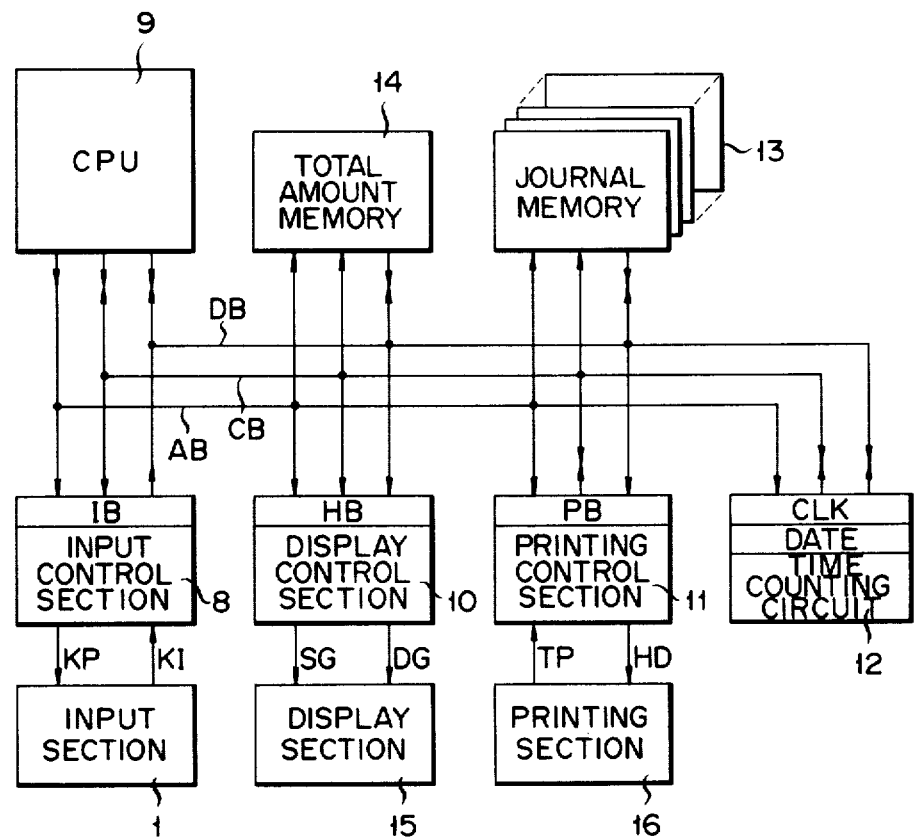
FIG. 2 is a view showing the circuit construction of one embodiment of the electronic cash register according to the invention.

FIG. 2 shows the total circuit construction of the electronic cash register. To the input section 1 described above, a timing signal KP from an input control section 8 is supplied. When key operation is made in the input section 1, the timing signal KP is selected, and then a key input signal KI is supplied to an input buffer IB provided in an input control section 8. The input control section 8 is connected to a central processing unit (CPU) 9 via a data bus DB, an address bus AB and a control bus CB. To these buses, a display control section 10, a printing control section 1, a time counting circuit 12, a journal memory 13 and a total amount memory 14 are connected.

The display control section 10 is provided with a display buffer HB, and a segment signal SG and a digit signal DG which are obtained through the decoding of the data in the display buffer HB are supplied for the display of the amount data as digital values.

The printing control section 11 includes a printing buffer PB, which compares a printing position signal TP representing the printing position of the printing drum supplied from a printing section 16 and the data in itself and supplies a hammer drive signal HD to the printing section 16 for printing amount data and the like on a recording sheet.

The time counting circuit 12 includes a CLK register, in which time data about the present hour, minute, etc. are stored, and a DATE register in which the date data is stored, and updating of the data is effected for every second. During the updating operation, a BUSY signal is provided to the CPU 9 via the control bus CB.

Figure 3:
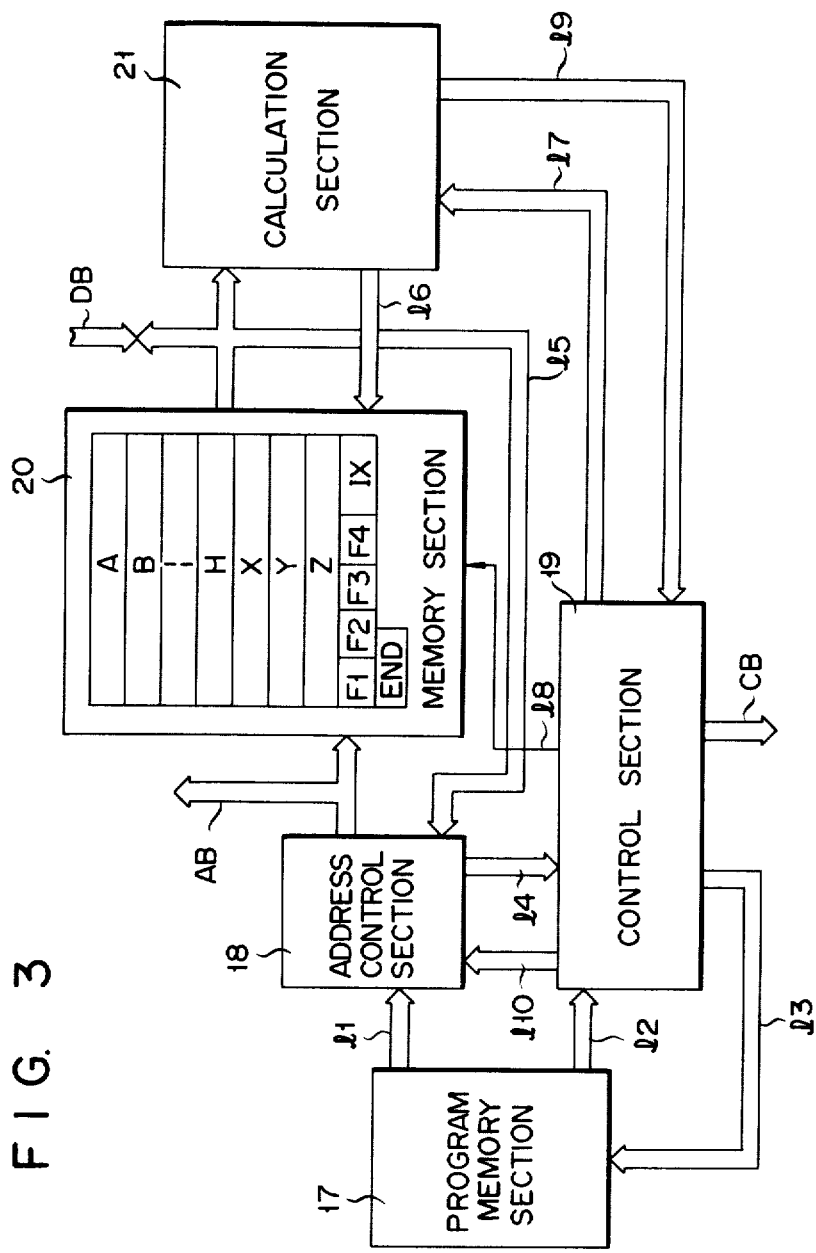
FIG. 3 is a schematic representation of a specific circuit construction of a CPU 9 shown in FIG. 2.

FIG. 3 shows the detailed circuit construction of the CPU 9. In the Figure, reference numeral 17 designates a program storage section which is constituted by a read only memory (ROM). The program storage section 17 provides an address signal through a line 11 to an address control section 18, and it also provides an operation code and a next address signal specifying the next address of the program storage section 17 to a control section 19 through a line 12. The next address signal is coupled through the control section 19. The next address signal is coupled from the control section 19 through a line 13 to the program storage section 17 to specify the address of the next microinstruction.

The address control section 18 specifies the addresses of the individual registers in a memory section 20, and it also provides the designated address through an address bus AB. Further, when the address designation is ended, it supplies an end signal through a line 14 to the control section 19. To the address control section 18, data read out from the memory section 20 is supplied through a line 15; this is what is called index addressing.

The memory section 20 includes A to H registers, X to Z registers, IX register and flag areas F1 to F4. The data read out from the memory section 20 are supplied to a calculating section 21 and are also sent forth through a data bus DB. The calculating section 21 performs various specified calculations, and the results of calculation are supplied through a line 16 to the memory section 20.

The control section 19 decodes the operation code supplied from the program memory section 17, and supplies a signal designating either addition or subtraction through a line 17 to the calculating section 21 and a write/read (W/R) signal through a line 18 to the memory section 20. The control section 19 also renews the next address according to whether there are data and carry provided from the calculating section 21 through a line 19 and supplies a signal designating either up-counting or down-counting to an address counter in the address control section 18. The control section 19 further supplies the R/W signal and chip designation signal through the control bus CB.

In the aforementioned journal memory 13 shown in FIG. 2, the memory area for each row has a memory capacity for 15 digits individually corresponding to respective column addresses "0" to "15", and 4-bit data are successively stored in the individual digit locations according to the operation of keys in the input section 1. More particularly, as shown in FIG. 4, hexadecimal notation codes "0" to "9" are stored in correspondence to the operation of the respective amount keys of "0" to "9". The correspondence of these key codes to the respective keys will now be described by using mnemonic symbols for the sake of explanation. The codes "1" to "9" respectively correspond to mnemonic symbols "1" to "9". Likewise, for the department "01" to "04" keys the codes "A" to "D" correspond to respective mnemonic symbols "01" to "04". For the "NS", "CA/AMT TEND", "Cr", "Ch", "Rc" and "Pd" keys, these keys being operated at the time of the registration, hexadecimal notation codes "E0" to "E5" correspond to respective mnemonic symbols "NS", "CA", "CR", "CH", "RC" and "PD". For the "TX", "ST", "NT", "X", "VD", "PERCENT", "PLUS" and "MINUS" keys hexadecimal notation codes "E6" to "E9" and "EA" to "ED" correspond to respective mnemonic symbols "TX", "ST", "NT", "X", "VD", "%", "+" and "−". The date data, clerk-in-charge A to F data, receipt number data, "REG", "REF" and "SET" mode data, time data, power recovery data and END data correspond to respective hexadecimal notation codes "F0~FD" and mnemonic symbols "DA", "A", "B", "C", "D", "E", "F", "ND", "REG", "REF", "SET", "TM", "PW" and "END".

In the total amount memory 14, the total of specific data among the data read out from the journal memory 13 at the time of the read operation or reset operation mode is stored.

Now, the operation of the embodiment according to the invention will be described. As shown in FIG. 2, the journal memory 13 having the required capacity is connected to the electronic register, and when the power source of the electronic register is turned on, the operation as shown in the flow chart of FIGS. 5A and 5B will be performed. In a step S1, the individual registers in the memory section 20 are initialized. Then, in a step S2 the present date data stored in the DATE register in the time counting circuit 12 is read out and written in a memory area M (IX) of the journal memory 13 specified by the output of the IX register in the memory section 20. Then, in a step S2 the content of the register IX is renewed. Then, in a step S3 the hexadecimal notation date code "F0" which corresponds to the mnemonic $\boxed{\text{DA}}$ is written in the memory area M (IX). The code will be explained below using a mnemonic $\boxed{\text{DA}}$. Subsequently, the content of the IX register is renewed every time the writing in the journal memory 13 is ended.

Then, in a step S4 the data of the mode designated by the mode switch 7 is written in the A register of the memory section 20. Then in a step S5 whether the present mode data in the A register and the mode data of the previous mode stored in the B register are equal is checked, and if not, a step S6 is executed. In the step S6 the mode data in the A register is transferred as the new mode data to the B register. Then, in a step S7 whether "1" is set in the flag area of the memory section 20, i.e., whether the END key is operated to show that the registration for one customer is ended, is checked, and if it is detected that the key is operated, a step S8 is executed. In the step S8, data "1" indicative of the fact that the mode data is switched is set in the flag area $F_2$, and then a step S9 is executed. The step S9 is also executed if it is detected in the step S5 that the content of the A register is equal to the content of the B register, and in this step the clerk-in-charge data specified by the operation of one of the clerk-in-charge switches 6 is written in the C register. Then, in a step S10 whether the present clerk-in-charge data stored in the C register and the previous clerk-in-charge data stored in the D register are equal is checked, and is not, a step S11 is executed. In the step S11, the present clerk-in-charge data in the C register is transferred as the new clerk-in-charge data to the D register. Then, in a step S12 whether data "1" indicative of the end of registration is set in the flag area F1, and if not, a step S13 is executed. In the step S13, data "1" indicative of that the clerk-in-charge is changed is set in the flat area F3, and the operation is then returned to the step S4. If it is detected in the step S7 or S12 that "0" is stored in the flag area F1, indicative of the change of mode switches 7 or change of clerk-in-charge during registration, an error treatment is executed in a step S14, and the operation is then returned to the step S4.

If it is detected in the step S10 that the clerk-in-charge data in the C register and clerk-in-charge data in the D register coincide, a step S15 is executed, in which the data stored in the input buffer IB is stored in the X register in the memory section 12. Then, in a step S16 whether the content of the X register is "0", i.e., whether the keying operation is effected, is checked, and if the content is found to be "0", the step S4 is executed, while otherwise a step S17 is executed. In the step S17 whether amount keys have been operated is checked, and if "YES" yields, a step S18 is executed. In the step S18, whether the operated amount key is for the first digit among a series of amount data keyed in, and if not, a step S19 shown in FIG. 5B is executed. In the step S19 the digit data in the Y register in the memory section 12 is taken up one place. If it is detected in the step S18 that the operated amount key is for the first digit, a step S20 is executed, in which whether data "1" showing the operation of the END key has been previously set in the flag area F1 is checked, and if "YES" yields, a step S21 is executed, in which "0" is written in the flag area F1. Then, in a step S22 whether data "1" indicative of the change of mode switches 7 is set is checked, and if "YES" yields, a step S23 is executed. In the step S23, the mode data stored in the A register is written in the memory area M (IX) in the journal memory 13, and then a step S24 is executed. The step S24 is also executed if it is detected in the step S22 that "0" is stored in the flag area F2. In the step S24, whether data "1" indicative of the change of clerks-in-charge is set in the flag F3 is checked, and if "YES" yields, a step S25 is executed. In the step S9 the clerk-in-charge data stored in the C register is written in the memory area M (IX) in the journal memory 8, and then a step S26 is executed. The step S26 is also executed if it is detected in the step S20 or S24 that "0" is stored in the flat area F1 or F3. In the step S26, the amount data stored in a digit X0 of the IX register is written in the digit Y0 in the Y register, and amount data are input by operating amount keys. Then, a step S27 is executed, in which the content of the Y register is transferred to the display buffer HB for display in the display section 15.

Figure 5A:
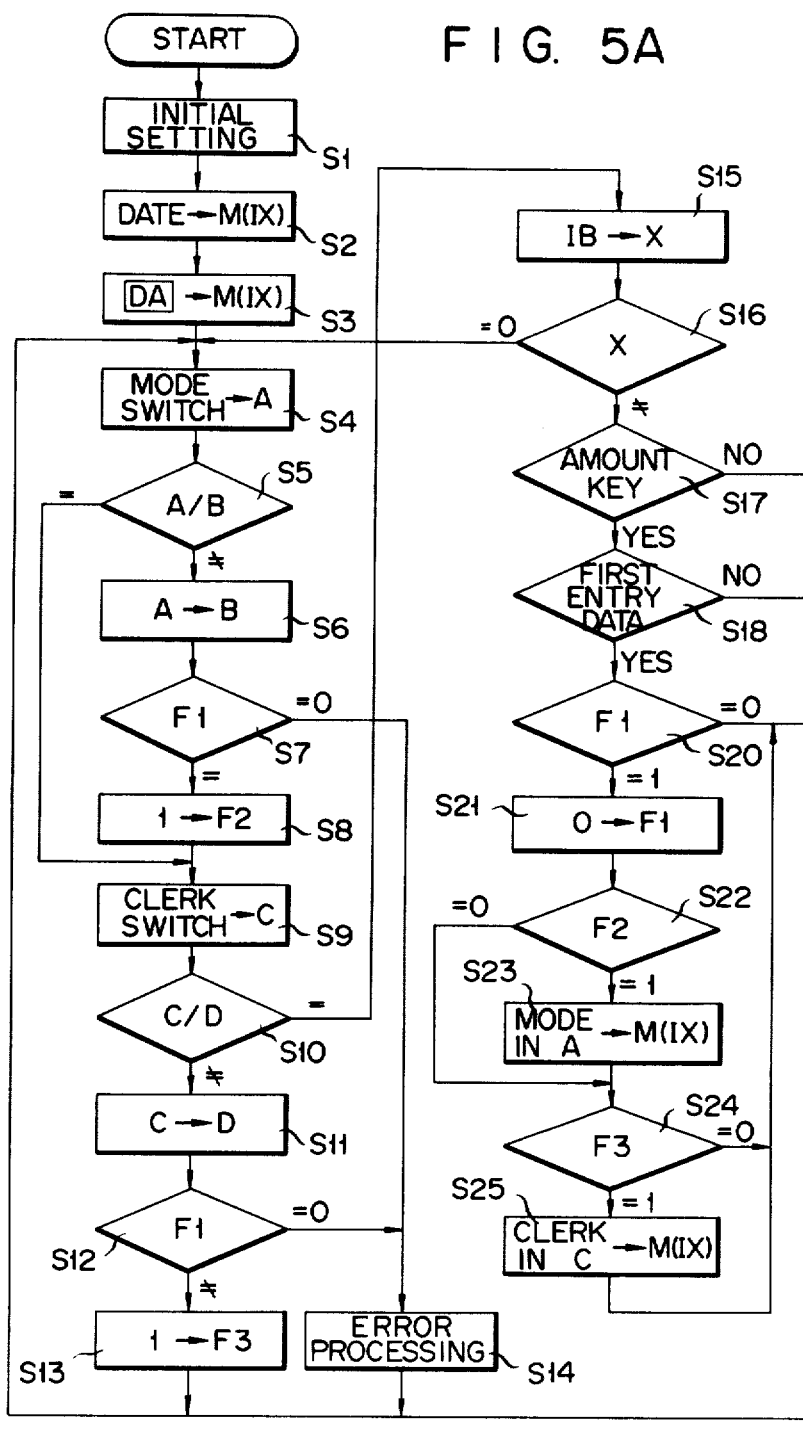
FIGS. 5A and 5B show a flow chart illustrating the operation of one embodiment of the electronic cash register according to the invention.
Figure 5B:
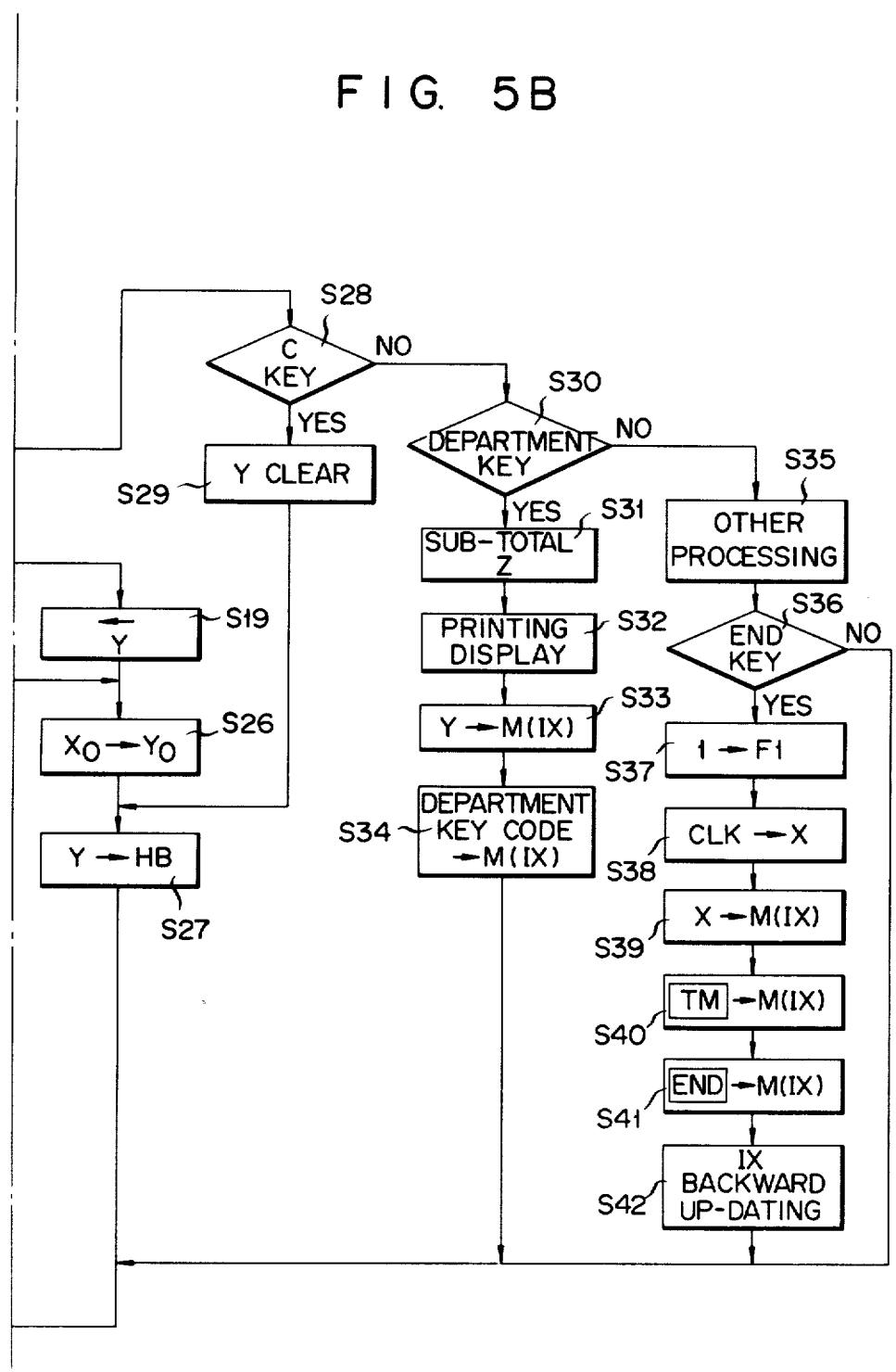

If it is detected in the step S17 shown in FIG. 5A that no amount key is operated, a step S28 shown in FIG. 5B is executed. In the step S28, whether the CLEAR key is operated is checked, and if "YES" yields, a step S29 is executed. In the step S29, the Y register is cleared, and then a step S27 is executed.

If it is detected in the step S28 that the CLEAR key is not operated, a step S30 is executed. In the step S30, whether a department key is operated is checked, and if "YES" yields, a step S31 is executed, in which the sales amount data are totaled and the result is stored in the Z register. Then, in a step S32 the department data stored in the X register is transferred to the printing buffer PB and display buffer HB. As a result, the transferred data is printed on a receipt sheet in a printing section 16 and also displayed in the display section 15. Then, a step S33 is executed, and the numerical value data stored in the Y register is transferred to the memory area M in the journal memory 13. Then, in a step S34 a department key code corresponding to the operated department key is transferred to the memory area M (IX) of the journal memory 13, and then the operation returns to the step S4.

If it is detected in the step S30 that no department key is operated, a step S35 is executed. In the step S35, processing operations with respect to the operation of keys other than the amount keys, CLEAR key and department keys for display and printing, and also key codes corresponding to operated keys are written in the journal memory 13. Then, in a step S36 whether the END key is operated is checked, and if "YES" yields, a step S37 is executed, in which data "1" indicative of the end of the registration is set in the flag area F1. Then, in a step S38 the present hour and minute data stored in the register CLK in the time counting circuit 12 is stored in the X register. Then, in a step S39 the hour and minute data stored in the X register is written in the memory area M (IX) of the journal memory 13. Then, in a step S40 the time code "TM" is written in the memory area M (IX) of the journal memory 13. Then, in a step S41 the END code "END" is written in the memory area M (IX) of the journal memory 13. Then, in a step S42 the content of the IX register is renewed to an address value of the memory area of the journal memory 13 in which the END code is stored, and then the operation returns to the step S4. After the end of the keying-in operation, stamp and date data are printed on the receipt sheet is effected in the printing section 16.

Figure 6:
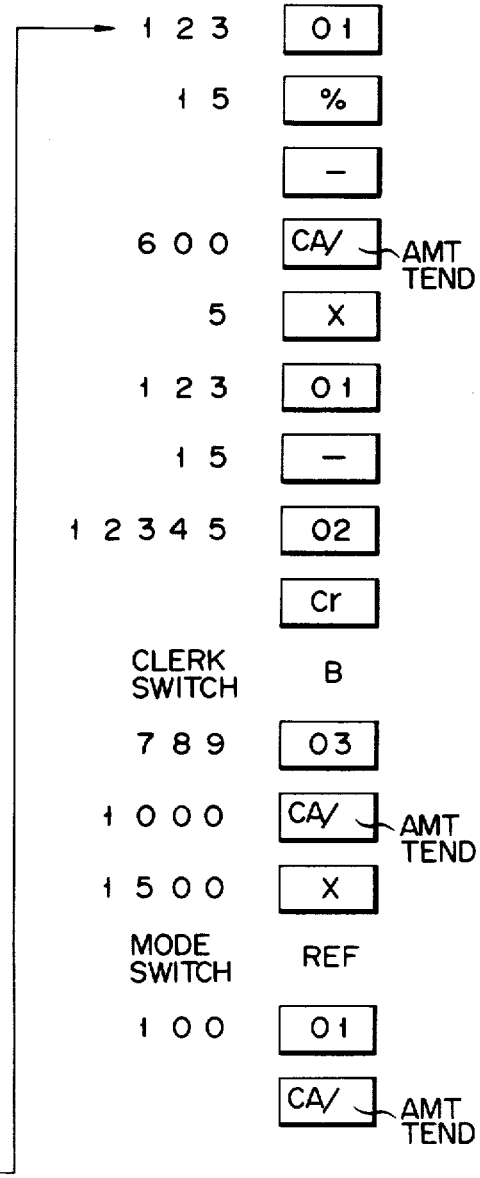
FIG. 6 is a view showing the order of operation of keys for bringing about an operation of one embodiment of the electronic cash register according to the invention.
Figures 7, 8:
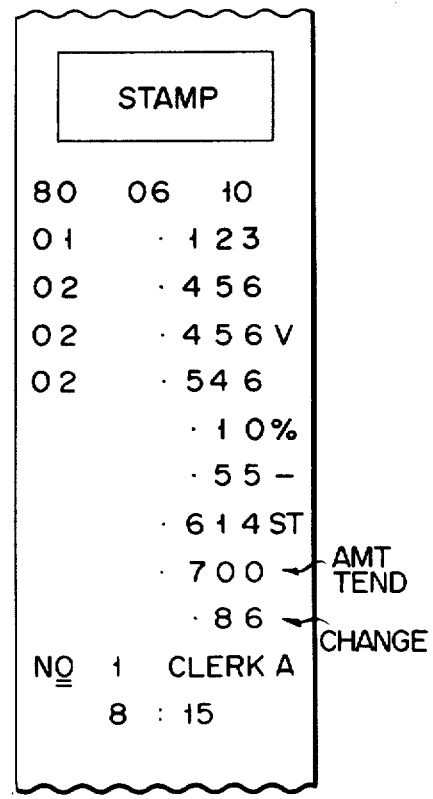
FIG. 7 is a view showing data stored in a journal memory 13 shown in FIG. 2.
FIG. 8 is a view showing a receipt on which data stored in FIG. 7 are printed.

Now, when power is turned on as shown in FIG. 6, the steps S1 to S3 are executed, whereby a DATE data "800610" representing the date of June 10, 1980 is stored in the row 0, columns 0 to 5 of the journal memory 13, and then a date code "DA" is stored in the row 0, columns 6 and 7. Then, with the mode switch 7 set to the "REG" mode and the clerk-in-charge switch 6 set to A, the steps S1 to S13, S4, S5, S9, S10 and S15 are successively executed. Then, with the operation of the amount keys for "123", the steps S16 to S27 are executed, the code "REG" is stored in the row 0, columns 8 and 9 of the journal memory 13 and the code "A" representing the clerk-in-charge A in the columns 10 and 11. Then, with the operation of the department "01" key, the steps S17, S28 and S30 to S34 are successively executed. At this time, the numerical data "123" is stored in the row 0 and columns 12 to 14 of the journal memory 13 and the code "01" representing the department "01" in the row 0 and column 1. At the same time, the same data are printed on the receipt as shown in FIG. 8. Then, with the operation of the amount keys for "456" and department "02" key, the corresponding data are similarly stored in the journal memory 13. With the subsequent operation of the V key, the step S35 is executed, whereby the code "VD" is stored in the row 1, columns 6 and 7, and at the same time a verification data is printed on the receipt mentioned above. Then, with the operation of the department key, PERCENT key and MINUS key, the corresponding key codes are similarly stored in the journal memory 13, and they are also printed on the receipt sheet. Then, with the operation of the amount keys for "7", "0" and "0" and CA/AMT TEND key, the steps S36 to S41 are successively executed, whereby the code "CA" representing the operation of the CA/AMT TEND key is stored in the row 2, columns 6 and 7 of the journal memory 13. Subsequently, hour and minute data "0815" is stored in the row 2, columns 10 to 13 and then the TIME code "TIME" in the row 2, columns 12 and 13, and and then the END code "END" is stored in the row 2, columns 14 and 15. Thereafter, the step S42 is executed to renew the IX register, and the next data is written backward from the row 2, column 14 of the journal memory 13. Also, the step S35 is executed, whereby the total amount data "614" stored in the Z register is printed, and also the data "614" is subtracted from the tended amount data "700" to print the change data "86". Then, the receipt number, clerk-in-charge and time data are successively printed, and the receipt which bears all the above data is issued.

In the manner as described above, the individual key codes are successively stored in the journal memory 13 as shown in FIG. 7 in correspondence to the operation of the keys as shown in FIG. 6.

Figure 9:
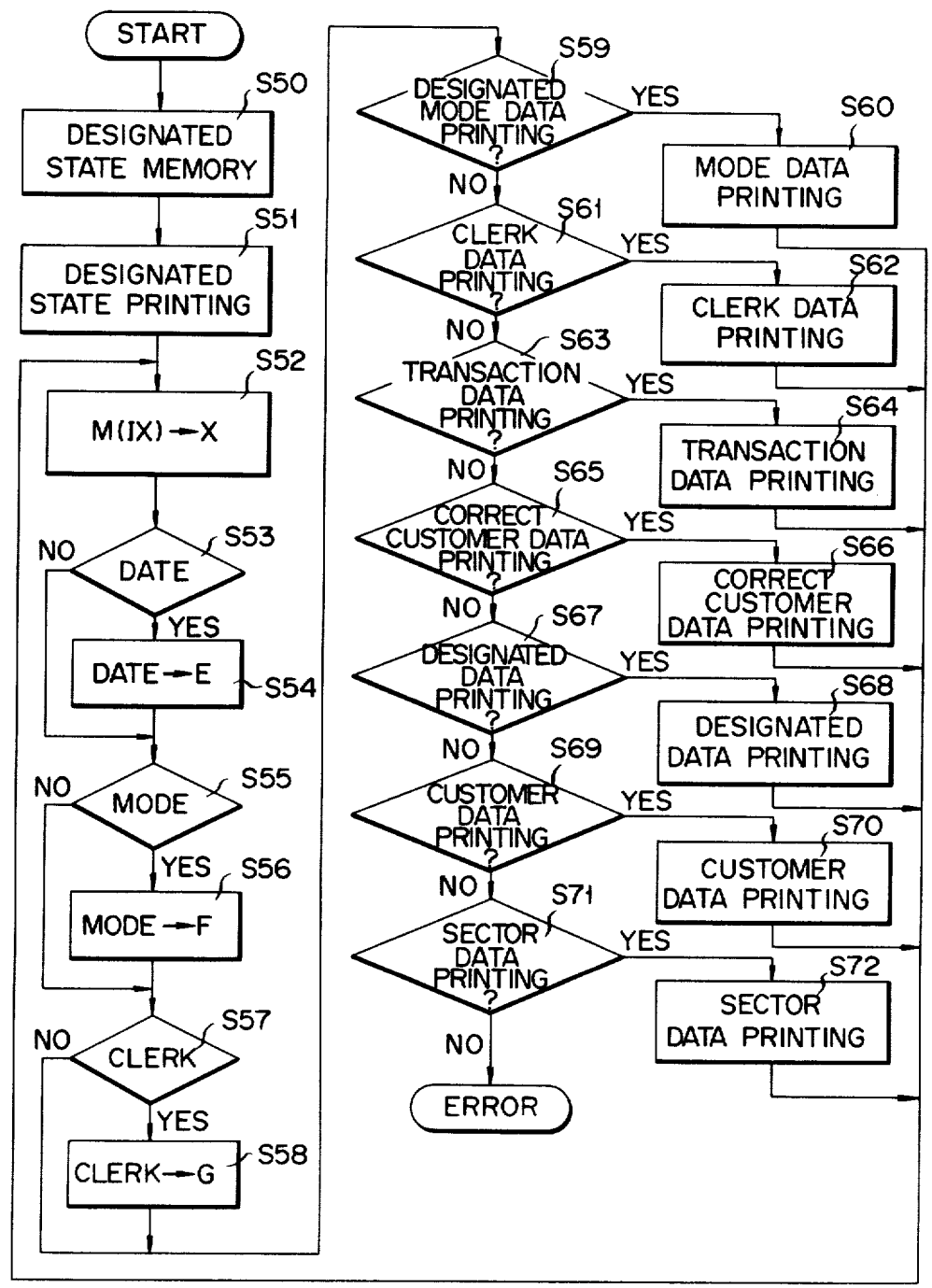
FIG. 9 is a flow chart illustrating a reading operation of one embodiment of the electronic cash register according to the invention.

The reading of the data stored in the journal memory 13 is effected in the manner as shown by the flow chart of FIG. 9. In the first place, a step S50 is executed, in which the data supplied from the input section 1 is stored to one of the registers in the CPU 9. The stored data corresponds to the data to be read out from the journal memory 13. The stored data is printed in the step S51 in the aforementioned printing section 16 under the control of the printing control section 11.

In the next step S52, the data stored in the memory area M (IX) of the journal memory 13 to be designated in the register (IX) are read out into the X register. In this case, the address in the register (IX) designates the first address of the journal memory 13. Next, when the step S52 is executed, the address is renewed. In the following step S53, whether the data read out into the X register is the date data is checked, and if it is the date data, it is stored in the register. If it is not any date data, a step S55 is executed, in which whether the read-out data is the mode specification data is checked. If it is the mode specification data, it is stored in the F register in a step S56. If it is not, a step S57 is executed, in which whether the aforementioned read-out data is the clerk-in-charge data is checked. If it is the clerk-in-charge data, it is stored in the G register in a step S58. If it is not any clerk-in-charge data, a step S59 is executed, in which whether the read-out data of the journal memory 13 is the data of the mode designated by the input section 1 is checked. If it is the designated mode data, a step S60 is executed, in which the designated mode data is printed, and the operation is returned to the step S52. If it is determined in the step S59 that the read-out data is not the designated mode data, a step S61 is executed, in which the data is about a particular one of a plurality of clerks-in-charge is checked. If it is determined that the data is about particular clerk-in-charge, a step S62 is executed, in which the clerk-in-charge data is printed, and then the operation is returned to the step S52. If it is determined that the data is not in charge of any particular clerk-in-charge, a step S63 is executed, in which whether the data is the data about transaction is checked.

If the data is determined to be about the transactions, it is printed in a step S64, and the operation is returned to the step S52. If the data is not the transaction data, a step S65 is executed, in which whether the data is customer verification data is checked. If "YES" yields in the step S65, a step S66 is executed, in which the customer verification data is printed, and the operation is returned to the step S52. If "NO" yields, a step S67 is executed, in which whether the data is a designation data such as verification data is checked. If "YES" yields, the designation data is printed in a step S68, and the operation is returned to the step S52. If "NO" yields, a step S69 is executed, whether the data is the customer data sorted according to the registration end data is checked. If "YES" yields in the check, a step S70 is executed, in which the customer data is printed. If "NO" yields, a step S71 is executed, in which the data is a bargain sale data or like sectional data is checked. If "YES" yields, the sectional data is printed in a step S72. Now, the embodiment will be described in detail in connection with the operation of steps S59 through S72.

Figure 10:
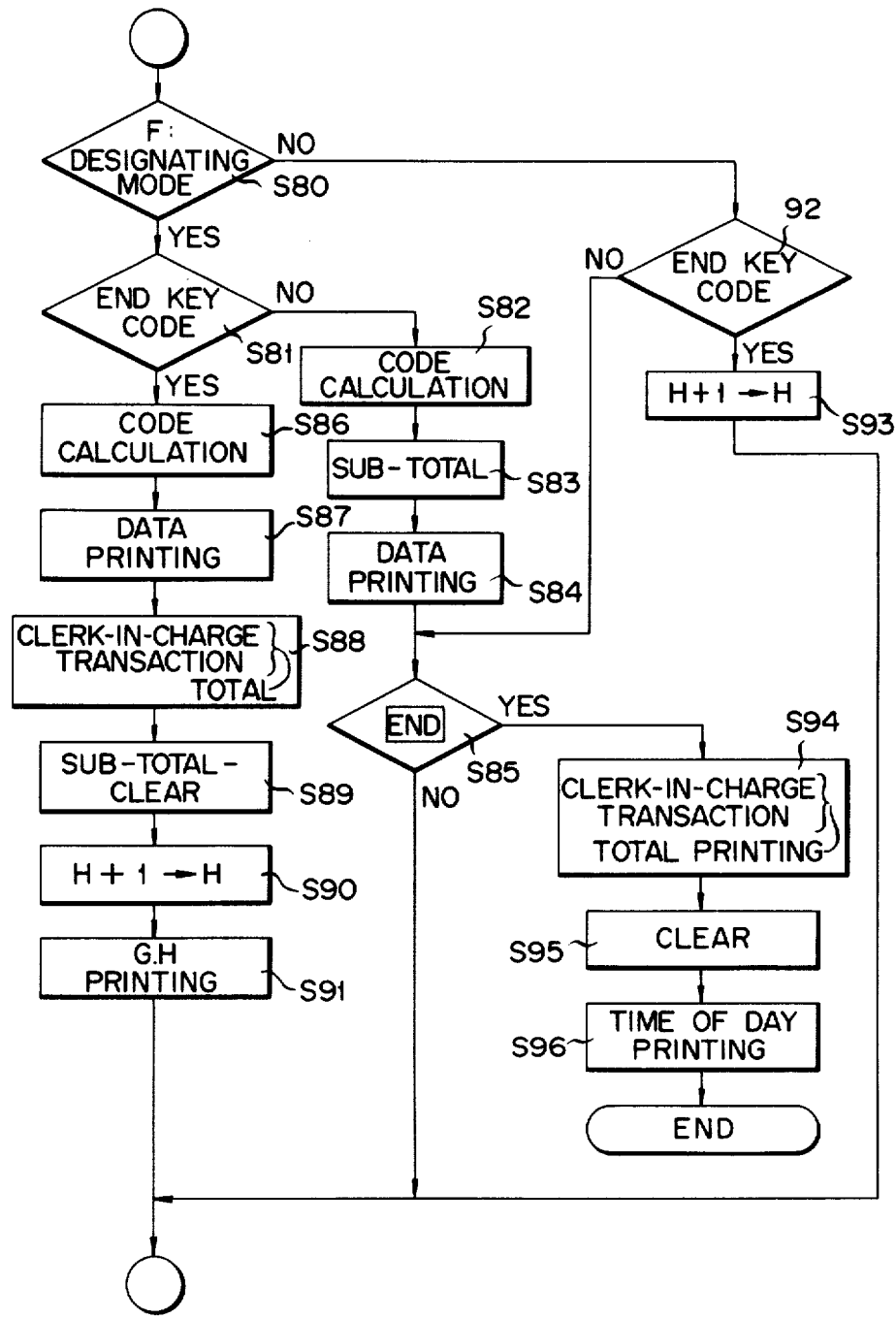
FIG. 10 is a flow chart illustrating an operation of checking only the data registered in a specific mode among all the data registered in the electronic cash register.

FIG. 10 shows a flow chart of operation, through which only the data coupled in the specific mode, for example, "REF" mode among the data registered in the electronic cash register are printed. In the first place, the mode switch 7 is set to the "X" mode, and then the amount key "8" and ST key "4" are operated. In this case, the operation of the amount key "8" designates the reading out of the "REF" mode and the operation of the ST key "4" designates the start of the operation. As a result, the operation from the step S50 through the step S58 in the flow chart of FIG. 9 is performed, and then a step S80 as shown in FIG. 10 is executed.

In the step S80, whether the mode code of the F register is the designated mode code is checked, and if "YES" yields, a step S81 is executed. In the step S81, whether the content of the X register is the END key code is checked, and if "NO" yields, a step S82 is executed, in which calculations for the individual codes according to the key codes stored in the X register are carried out. Then, a step S83 is executed, in which the calculated sales data are sub-totaled and the result is stored in the register in the CPU 9. Then, a step S84 is executed, in which the aforementioned individual code calculation data and total amount data are printed on a recording sheet in the printing section 16. Then, a step S85 is executed, in which whether the key code newly written in the X register is the END key code is checked, and if "NO" yields, the step S52 shown in FIG. 9 is executed.

If it is judged in the step S81 that the content of the X register is the END key code, a step S86 is executed, in which calculations for individual codes according to the key codes stored in the X register are carried out. Then, in a step S87 the individual code calculation data are printed on the recording sheet. Then, a step S88 is executed, in which the sales data for each customer registered in the designated mode are classed according to the individual clerks-in-charge and transactions, and the stored data are accumulated in the corresponding memory areas of the RAM in the total amount memory 14 shown in FIG. 2. Then, a step S89 is executed, in which the total data stored in the CPU 9 is cleared. Then, a step S40 is executed, in which "1" is added to the receipt sheet number stored in the H register in the CPU 9. Then, a step S91 is executed, in which the clerk-in-charge code stored in the G register and the receipt sheet number stored in the H register are printed on the recording sheet, and then the operation is returned to the step S52.

If it is judged in the step S80 that the content of the F register is not for the designated mode, a step S92 is executed. In the step S92, whether the content of the X register is the END key code is checked, and if "NO" yields, the step S85 is executed, while otherwise a step S93 is executed. In the step S93, "1" is added to the receipt sheet number stored in the H register, and then the operation is returned to the step S52.

If it is judged in the step S85 that the content of the X register is the END key code, a step S94 is executed, in which the total data for the individual clerks-in-charge and transactions in the designated mode stored in the aforementioned RAM are printed on the recording sheet. Then, a step S95 is executed, in which the total data in the RAM are cleared. Then, a step S96 is executed, in which the present time data stored in the CLK register of the time counting circuit 12 is transferred to the printing buffer PB and printed on the recording sheet.

As the result of the execution of the steps S50 through S58 and S80 through S96, "REF" indicating the designated mode is printed on the recording sheet as shown in FIG. 11, and then the refund data keyed into the journal memory 13 in the "REF" mode are successively read out and printed on the recording sheet. Further, the aforementioned refund data are classed for the individual transactions and clerks-in-charge, and the result is printed on the recording sheet. The data coupled in the other modes can also be printed entirely in the same manner as described above; data stored in the "REG" mode can be printed on the recording sheet by setting the mode switch to the "X" mode and operating the amount key of "7" and ST key, and the data stored in the "SET" mode can be printed by setting the mode switch to the "X" mode and operating the amount key of "9" and ST key.

While in the above embodiment the key codes are successively stored in the journal memory 13 as they are keyed in, it is also possible to let the amount data and other data be stored in the journal memory 13 after they are keyed in.

Further, while in the above embodiment the mode code is stored at the time of the first registration after the operation of the mode switch 7, it is also possible to store the mode code at the time of the registration for the registration for each customer.

Further, data coupled through an OCR or an OMR can be treated in the same way as the data coupled by the keying operation.

Figure 12:
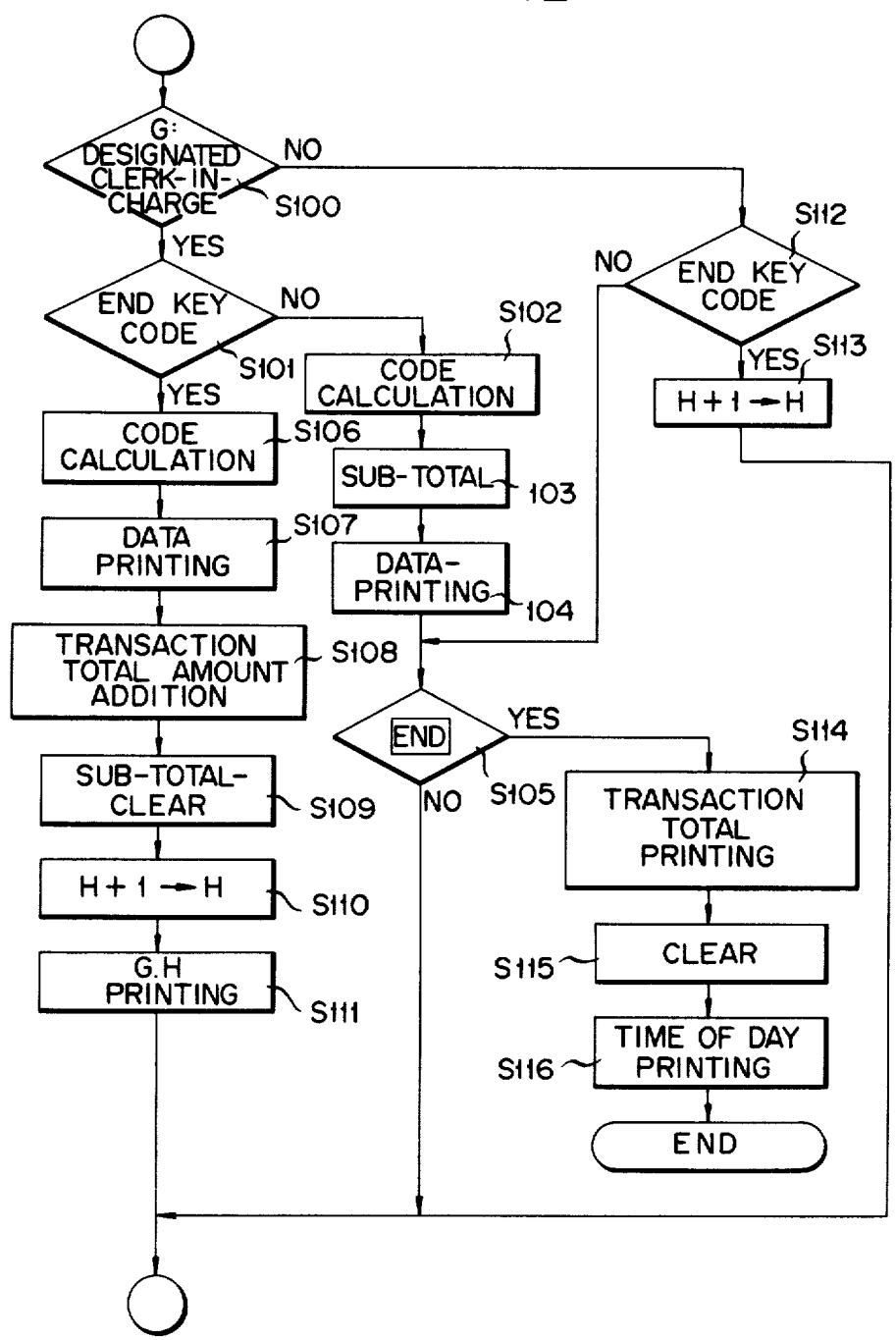
FIG. 12 is a view showing a flow chart illustrating an operation of checking only the data in charge of a particular clerk-in-charge among the data in charge of a plurality of clerks-in-charge registered in the electronic cash register.

When it is desired to provide only the key codes keyed in by the clerk-in-charge B among the key codes stored in the journal memory 13 as the printing output, after setting the mode switch to the "X" mode the amount key of "2" and ST key are operated. In this case, the amount keys of "1" to "6" correspond to the clerks-in-charge A to E respectively. With the operation of the aforementioned keys, an operation as shown by the steps of S50 to S59 and S61 of the flow chart of FIG. 9 is brought about. In the step S61, if it is judged that the printing data is a clerk-in-charge data, the step S62 is executed. The flow chart of the step S62 is shown in FIG. 12. In the first place, a step S100 is executed, in which whether the clerk-in-charge code in the G register is the designated clerk-in-charge code is checked. If "YES" yields, a step S101 is executed. In the step S101, whether the content of the X register is the END key code keyed in at the end of the registration for one customer is checked, and if "NO" yields, the step S102 is executed, in which calculations for the individual codes according to the key codes stored in the X register are carried out. Then, in a step S103 the sales data in the X register are sub-totaled and the result is stored in the register of the CPU 9. Then, a step S104 is executed, in which the aforementioned individual code calculation data are printed on recording sheet in the printing section 16. Then, a step S105 is executed, in which whether the key code in the X register is the END key code is checked, and if "NO" yields, the operation is returned to the step S52.

If it is determined in the step S101 that the content of the X register is the END key code, a step S106 is executed, in which calculations for individual codes according to the key codes stored in the X register are carried out. Then, a step S107 is executed, in which the individual code calculation data and sub-total data are printed on the recording sheet. Then, a step S108 is executed, in which the sales data for each customer registered in charge of the designated clerk-in-charge are classed according to the transactions such as cash sales and check sales, and the individual transaction data are accumulated in the corresponding memory areas in the total amount memory 14. Then, a step S109 is executed, in which the total data stored in the CPU 9 is cleared. Then, a step S110 is executed, in which "1" is added to the data indicating the series number of the receipt stored in the H register of the CPU 9. Then, a step S111 is executed, in which the designated clerk-in-charge code stored in the G register and receipt series number data stored in the H register are printed on the recording sheet. The operation is then returned to the step S52 as shown in FIG. 9.

If it is determined in the step S100 that the content of the G register is not the designated clerk-in-charge code, a step S112 is executed, in which whether the content of the X register is the END key code is checked. If "NO" yields in this step, a step S113 is executed, in which "1" is added to the data indicating the receipt series number stored in the H register, and then the operation is returned to the step S52.

If it is judged in the step S105 that the content of the X register is the END key code, a step S114 is executed, in which the total data for individual kinds of transactions in charge of the designated clerk-in-charge stored in the RAM of the total amount memory 14 are printed on the recording sheet. Then, a step S115 is executed, in which the total data in the aforementioned RAM are cleared. Then, a step S116 is executed, in which the time data stored in the CLK register in the time counting circuit 12 is transferred to the printing buffer PB and printed on the recording sheet.

As the result of the execution of the steps S50 through S58 and S100 through S116, "B" representing the clerk-in-charge is printed on the recording sheet as shown in FIG. 13, and then the key codes keyed in with the clerk-in-charge key 6 set to "B" are successively read out and processed in a predetermined manner for printing on the recording sheet. Further, the sales data stored in charge of the clerk-in-charge B are classed according to different kinds of transactions, and the result is printed. The keyed data in charge of the other clerks-in-charge can also be printed entirely on the same manner as described above; by setting the mode switch to the designation mode and operating one of the amount key of "1" and "3" to "6", the corresponding one of the clerks-in-charge A and C to F is designated, and the key codes coupled in charge of the specified clerk-in-charge is provided as printing output from the journal memory 13.

While in the above embodiment the key codes are successively stored in the journal memory 13 as they are keyed in, it is also possible to let the amount data and other data that are obtained after the key codes are processed according to the operation of given keys be stored as well in the journal memory 13.

Further, while in the above embodiment the clerk-in-charge code is stored at the time of the registration made for the first time after the operation of the clerk-in-charge switch 6, it is also possible to let the clerk-in-charge code be stored at the time of the registration for the registration for each customer.

Further, data coupled through an OCR or an OMR can be treated in the same way as the data coupled by the keying operation.

Figure 14:
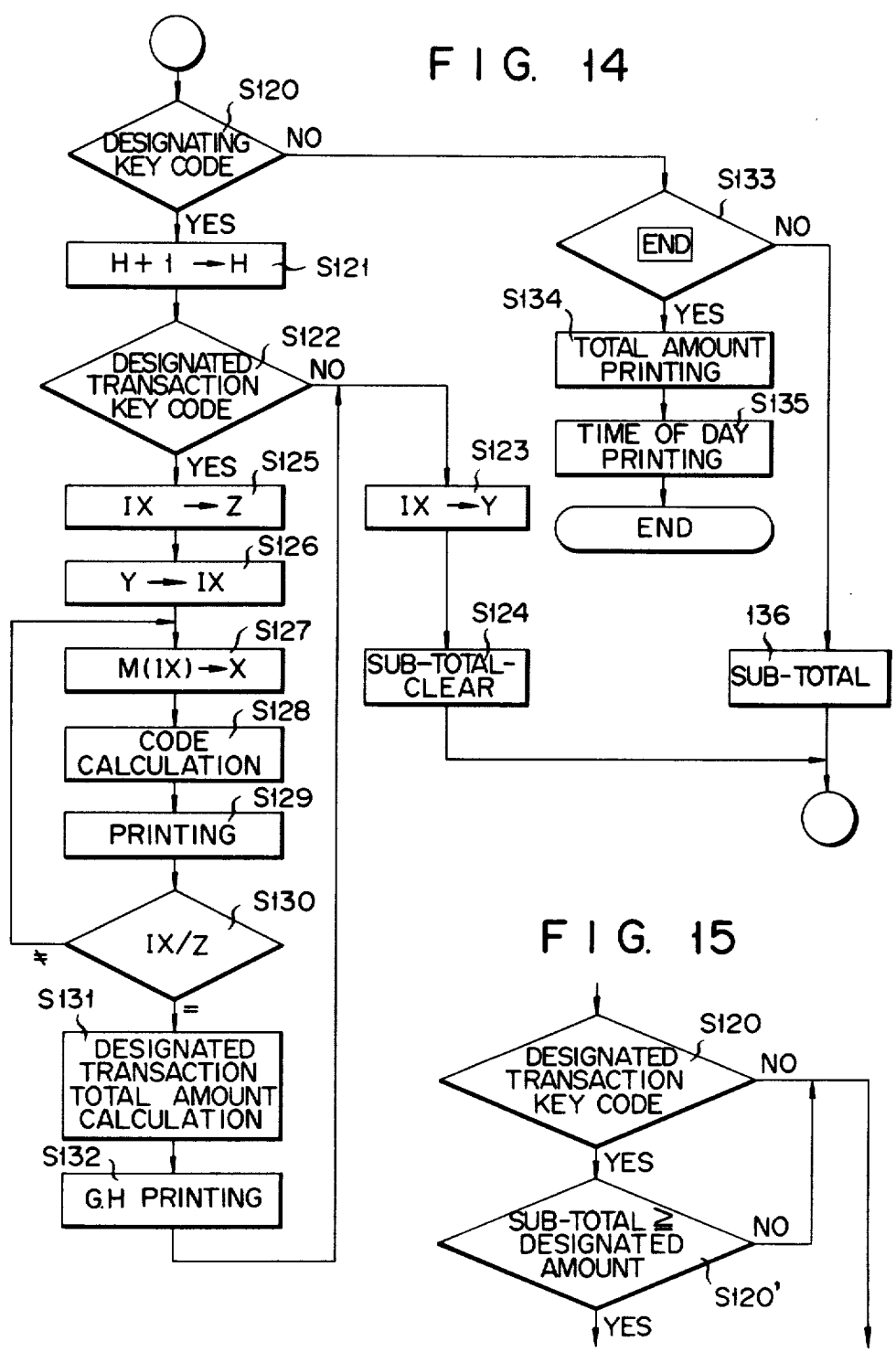
FIG. 14 is a view showing a flow chart illustrating the operation of checking only the data of a particular kind of transaction among the data of a plurality of different transactions registered in the electronic cash register.

With it is desired to read out and print only the data corresponding to a desired department key, after setting the mode switch 7 to the "X" mode and either the Pd, Rc, Cr, Ch or CA/AMT TEND key is operated. As a result, an operation as shown by the flow chart of FIG. 14 is brought out according to the steps S50 to S59, S61 and S63. In the step S63, if it is judged that the printing data is a transaction data the step S64 is executed. The flow chart of the step S64 is shown in FIG. 14. In the first place, a step S120 is executed, in which whether the content of the X register is the END key code is checked, and if "YES" yields, a step S121 is executed. In the step S121, "1" is added to the data showing the number of times of issuance of receipts in the H register. Then, a step S122 is executed, in which whether the content of the X register is the designated department key code is checked, and if "NO" yields, a step S123 is executed. In the step S123, the index data stored in the IX register is transferred to the Y register for evasion. Then, a step S124 is executed, in which the total data calculated in the CPU 9 is cleared, and the operation is returned to the step S52 shown in FIG. 9 to renew the content of the IX register in the CPU 9. Thereafter, the content of the IX register is renewed every time the read-out of the content of the IX register is effected.

If it is judged in the step S122 that the content of the X register is the designated department key code, a step S125 is executed. In the step S125, the index data designating the department code in the IX register is transferred to the Z register. Then, a step S126 is executed, in which the index data stored in the Y register is written in the IX register. Then, a step S127 is executed, in which the data stored in the memory area M (IX) of the journal memory 13 is written in the X register. Then, a step S128 is executed, in which calculations for individual codes corresponding to the key codes read out from the journal memory 13, i.e., calculations of the change, tax, etc., are carried out. Then, a step S129 is executed, in which the read-out key code and the results of the individual code calculations are printed in the printing section 4. Then, a step S130 is executed, in which whether the content of the IX register and the index data of the Z register are equal is checked, and if "NO"

yields, the operation is returned to the step S127, while otherwise a step S131 is executed. In the step S131 the totaling of the designated transaction data is carried out. Then, a step S132 is executed, in which the clerk-in-charge data stored in the G register and the serial number of the issued receipt stored in the H register are printed on the recording sheet, and then the operation is returned to the step S123.

If it is determined in the step S120 that the content of the X register is not the END key code, a step S133 is executed. In the step S133, whether the content of the X register is the END key data is executed, and if "NO" yields, a step S136 is executed. In the step S136, the content of the X register is totaled, and then the operation is returned to the step S52. If it is judged in the step S133 that the content of the X register is the END key data, a step S134 is executed. In the step S134, the total of the designated transaction data is printed on the recording sheet. Then, a step S135 is executed, in which the present time data stored in the CLK register is read out and printed on the aforementioned recording sheet, thus bringing an end to the operation of printing of data concerning the designated transaction key.

Now, if the CA/AMT TEND key is designated as the transaction key, the aforementioned step S51 is executed, whereby "CA . . . CA" as shown in FIG. 16A is printed, and also the steps S52 to S58 and S120 to S136 are executed, whereby a group of data concerning the CA/AMT TEND key stored in the journal memory 13, the clerk-in-charge symbol, the number of receipt issued are successively printed on the recording sheet. When the printing of the data concerning the CA/AMT TEND key is all ended, the steps S24 and S25 are executed, whereby the total "0.29875" of the CA/AMT TEND data and the present time data "17:19" are printed on the recording sheet. Likewise, if the Cr key is designated as the transaction key, the credit sales data are read out from the journal memory 13 and printed on the recording sheet as shown in FIG. 16B, and then the total credit sales data "0.18347" is printed.

Figure 15:
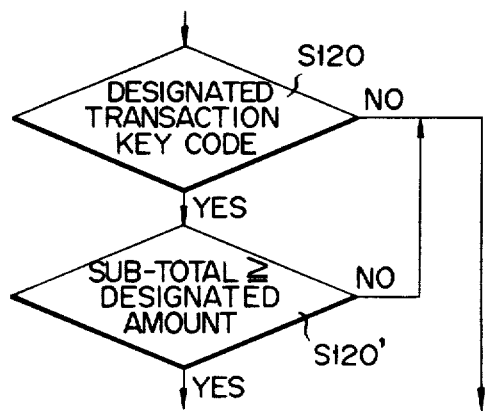
FIG. 15 is a view showing part of a modification of the flow chart shown in FIG. 14.

When it is desired to read out from the journal memory 13 and provide as printing output data in a data group for a customer designated by a transaction key only when the total amount is above a designated amount, an operation as shown by the flow chart of FIG. 15 is effected. If it is judged in the step S120 that there is a designated transaction key code in the X register, a step S120 is executed. In the step S120, where the total data stored in the Y register is greater than the designated amount is checked, and if "YES" yields, the aforementioned step S125 is executed, while otherwise the step S123 is executed. The rest of the operation is entirely the same as in the flow chart of FIG. 14.

When it is desired to print credit sales data in excess of the designated amount, for instance 10,000 yen, the amount keys for "10,000" and Cr key are operated in the "X" mode as shown in FIG. 17A. As a result, ". . . 10,000 Cr" is printed on the recording sheet, and then total data in excess of 10,000 yen stored in the journal memory 8, and total amount "0.23435" and the time data of the instant of the end of printing are printed. When it is desired to print check sales data in excess of 500 yen, the amount keys for "500" and "Ch" key are operated as shown in FIG. 17B, whereby the check sales data in excess of 500 yen, their total amount, etc. are recorded on the recording sheet are printed.

While in the above operation the transaction key has been operated in the "X" mode, the same operation may also be obtained by operating the transaction key in the "Z" mode.

Further, while in the above embodiment the journal memory 13 is removably connected to the electronic cash register, it may be permanently secured to the electronic cash register.

Further, while in the above embodiment the key code data corresponding to the operated keys are successively stored in the journal memory 13, it is also possible to let the amount data such as change data obtained after the key codes are processed according to the operation of given keys be stored in the journal memory 13 as well.

Further, data coupled through an OCR or an OMR can be treated in the same way as the data coupled by the keying operation.

When it is desired to read out and inspect a data group for one customer including data corresponding to a designated key among the data stored in the journal memory 13, the mode switch is set to the X mode, then a necessary designation key such as the V, TX, NS, PERCENT, PLUS, MINUS, MULTIPLY, TIME and department "01" to "04" keys are operated, and then the CA/AMT TEND key is operated. As a result, an operation as shown in the steps S50 to SS59, S61, S63 and S65 of the flow chart of FIG. 9 takes place. In the step S65, if it is judged that the printing data is a correct customer data, the step S66 is executed. The flow chart of the step S66 is shown in FIG. 18. In the first place, a step S140 is executed, in which whether the content of the X register is the END key code is checked, and if "YES" yields, a step S141 is executed. In the step S141, "0" is written in the flag area F4. Then, a step S142 is executed, in which "1" is added to the content of the H register of the CPU 9 and the result is written in the H register. Then, a step S143 is executed, in which the content of the IX register is read out and the index data is written in the Y register, and the operation is returned to the step S52 as shown in FIG. 9.

If it is judged in the step S140 that the content of the X register is not the END key code, a step S144 is executed. In the step S144, whether "1" which is set at the time when the designation key code is read out from the journal memory 13 is stored in the flag area F4 is checked, and if "YES" yields, a step S145 is executed. In the step S145, the content M (IX) of the journal memory 13 is written in the X register. Then, a step S146 is executed, in which individual code calculations such as change calculation according to the key codes stored in the X register are carried out. Then, in a step S147 the calculated sales data are totaled and stored. Then, in a step S148 the calculation data corresponding to the key codes and/or the results of sub-totaling are printed on the recording sheet in the printing section 4, and then the operation is returned to the step S2.

If it is determined in the step S144 that "0" is stored in the flag area F, a step S149 is executed. In the step S149, whether the content of the X register is the designated key code is checked, and if "YES" yields, a step S150 is executed. In the step S150, "1" indicating the reading of the designated key code is set in the flag area F4. Then, a step S151 is executed, in which the index data designating the next address to the previous END key code stored in the Y register is transferred to the IX register, and the operation is returned to the aforementioned step S52.

If it is judged in the step S149 that the content of the X register is not the designated key code, a step S152 is executed, in which whether the content of the X register is the END key code is checked. If "YES" yields, the operation of printing the designated data is ended, and if "NO" yields, the operation is returned to the aforementioned step S52.

When printing sales data including correction data for the individual customers by designating the V key, the amount key for "0" and "V" key are operated in the "X" mode as shown in FIG. 19A. As a result, the step S51 shown in FIG. 9 is executed, whereby "... 0 V" is printed, and also the steps S52 to S58, S140, S149, S152 and S52 are repeatedly executed, followed by the execution of the steps S149 to S151 and then the repeated execution of the steps S149 to S151, whereby a group of data "01 0.123" to "AN 01" for one customer are successively printed. Likewise, data groups including the correction data for other customers are successively read out from the journal memory 13 and printed on the recording sheet. Further, when the TX key is designated and the amount key for "0" and "TX" key are operated as shown in FIG. 19B, the data groups including the tax fee data for the respective customers are successively printed on the recording sheet.

While in the above operation the designation key has been operated in the "X" mode, the same operation may also be obtained by operating the designation key in the "Z" mode.

Further, while in the above embodiment the journal memory 13 is removably connected to the electronic cash register, it may be permanently secured to the electronic cash register.

Further, while in the above embodiment the key code data corresponding to the operated keys are successively stored in the journal memory 13, it is also possible to let the amount data obtained after the processing of the key codes corresponding to the operated keys be stored in the journal memory 13.

Further, data coupled through an OCR or an OMR can be treated in the same way as the data coupled by the keying operation.

Figure 20:
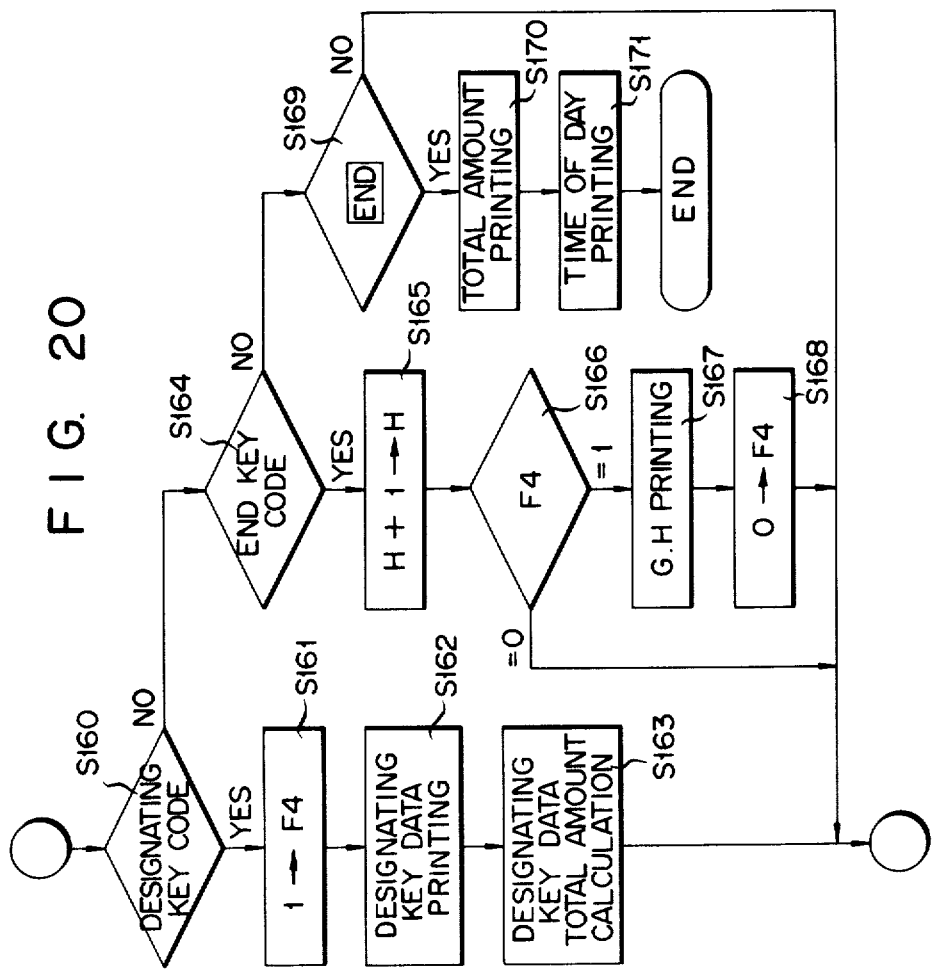
FIG. 20 is a view showing a flow chart illustrating an operation, in which particular data, for instance verified data, among the data registered in the electronic cash register are checked.

When it is desired to print and inspect only the data corresponding to a given key among the data stored in the journal memory 13, the mode switch is set to the "X" mode, then the given designation key such as the V, TX, NS, PECENT, PLUS, MINUS, MULTIPLY, TIME and department "01" to "04" keys are operated, and then the ST key is operated. As a result, an operation as shown in the flow chart of FIG. 9 is brought about according to steps S50 to S59, S61, S63, S65 and S67. In the step S67, if it is judged that the printing is a designated data, step S68 is executed. The detail flow of step S68 is shown in FIG. 20. In the first place, a step S160 is executed, in which whether the content of the X register includes a designated key code is checked, and if "YES" yields, a step S161 is executed. In the step S161, "1" is set in the flat area F4. Then, a step S162 is executed, in which the desgnted key data is transferred to the printing buffer PB and printed in the printing section 16. Then, a step S163 is executed, in which the designated key data read out from the journal memory 13 is added to the previous total data of the designated keys and also the designated key codes are counted, and the operation is then returned to the step S52.

If it is determined in the step S160 that there is no designated code in the X register, a step S164 is executed. In the step S164, whether there is an END key code in the X register is checked, and if "YES" yields, a step S165 is executed. In the step S165, "1" indicating the end of the instant registration is added to the data in the H register, and the result is written in the H register. Then, a step S166 is executed, in which whether a flag "1" indicating that the designated key code is stored in the X register is set in the flag area F4. If "YES" yields, a step S167 is executed. In the step S167, the clerk-in-charge data stored in the G register and series receipt number data stored in the H register are printed. Then, a step S168 is executed, in which "0" is written in the flag area F4, and then the operation is returned to the step S52.

If it is determined in the step S164 that no END key code is in the X register, a step S169 is executed. In the step S169, whether an END key code showing the end of writing in the journal memory 13 is checked, and if "NO" yields, the step S52 is executed. If "YES" yields, a step S170 is executed, in which the total data for the designated key is transferred to the printing buffer PB and printed. Then, a step S171 is executed, in which the time data is read out from the CLK register in the time counting circuit 12 and transferred to the printing buffer PB for printing.

With the V key operated as designation key as shown in FIG. 22A, the aforementioned step S51 is executed, whereby "... V" is printed on the recording sheet, and then the steps S52 through S58, steps S61, S63, S65, S67 and S160 through S171 are executed, whereby the V key data stored in the journal memory 13, symbols of clerks-in-charge who operated the V key and data about the series number of the receipt when the V key was operated are printed. When the printing of all the V key data is ended, the steps S170 and S171 are executed, whereby the corrected total data "0.2534 V TOTAL" and present time data "17:15" are printed on the recording sheet. Likewise, with the MINUS key operated as shown in FIG. 22B, the discount data are read out from the journal memory 13 and printed on the recording sheet, and then the number "23" of times of operation of the MINUS key, the total of discounting "435-TOTAL" and the present time are printed.

Figure 21:
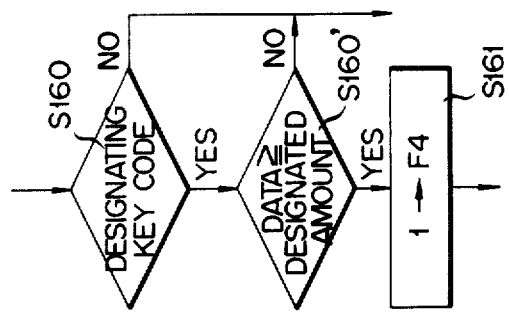
FIG. 21 is a view showing part of a modification of the flow chart shown in FIG. 20.

When it is desired to let only the data of amounts is excess of a designated amount among the data designated by the designation key be provided from the journal memory 8, a step S160' is provided between the aforementioned steps S160 and S161 as shown in FIG. 21. If it is determined in the step S160 that there is a designated key code in the X register, the step S160' is executed, in which whether the amount data corresponding to the designation key is in excess of the designated amount is checked, and if "YES" yields, the step S161 is executed. If "NO" yields, the step S164 is executed. The rest of the operation is the same as in the flow chart of FIG. 20.

For example, when it is desired to provide as the printing output the data for amounts in excess of 10,000 yen by designating the department "10" key, the amount keys for "10,000" and department "01" key are operated in the "X" mode as shown in FIG. 23A. As a result, the symbol "01" of the designated key and the designated amount "10,000" are printed, and then the department data in excess of 10,000 yen stored in the journal memory 13, symbols of the relevant clerks-in-charge and serial numbers of the relevant receipts are printed. Then, the number "5" of the data for amounts in excess of 10,000 yen, the total amount "0.54321" and time at the end of printing are printed. When it is desired to provide as the printing output the V data in excess of 500 yen, the amount keys for "500" and V key are operated as shown in FIG. 23B. As a result, the V data in excess of 500 yen, the number of V data, the total of V data, etc. are printed.

While in the above embodiment the journal memory 13 is removably connected to the electronic cash register, it may be permanently secured to the electronic cash register.

Further, while in the above embodiment the key codes are successively stored in the journal memory 13 as they are keyed in, it is also possible to let the amount data be stored in the journal memory 13 after the input treatment corresponding to the operated keys.

Further, while the above embodiment has concerned with the electronic cash register, it is also possible to apply the invention to other electronic apparatus where data are keyed in.

Further, data coupled through an OCR and an OMR can be treated in the same way as the data coupled by the keying operation.

Figure 24:
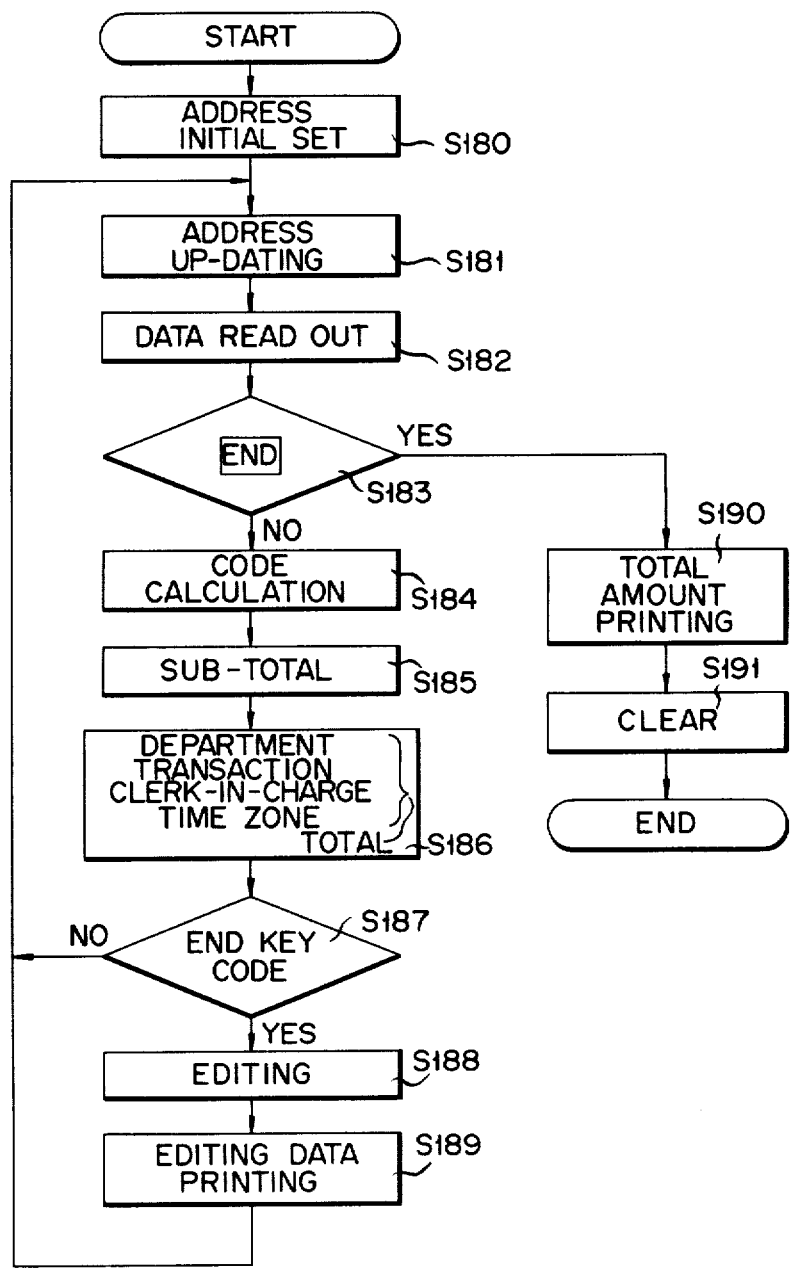
FIG. 24 is a view showing a flow chart illustrating an operation, in which data obtained as a result of editing of data for different customers separated from one another by registration end data stored in the electronic cash register and read out in a reading operation mode is provided.

Now, by operating the ST key and then CA/AMT TEND key with the mode switch 7 set to the "Z" mode, a step S70 is executed. The detail flow of the step S70 is shown in FIG. 24. In the first place, in a step S180 the IX register in the memory section 20 is initialized. As a result, address initialization is obtained. Then, a step S181 is executed, in which the content of the IX register is renewed, and the address thereof is renewed. Then, a step S182 is executed, in which the key codes stored in the memory area of the journal memory 13 designated by the IX register are read out. Then, a step S183 is executed, in which whether an END code is contained in the data read out from the journal memory 13 is checked in the calculating section 21, and if "NO" yields, a step S184 is executed. In the step S184, calculations according to individual key codes read out are carried out; for example, a change is calculated if there is an amount data before a code "CA", a discount is calculated according to codes "PERCENT" and "MINUS", a premium is calculated according to codes "PERCENT" and "PLUS", and further price reduction, addition and tax calculations are made. Then, a step S185 is executed, in which the total of the sales data read out is obtained. Then, a step S186 is executed, in which the calculated total data are classified according to the departments, transactions, clerks-in-charge and time zones and the classified total are accumulated in the corresponding memory areas of the total amount memory 14. Then, a step S178 is executed, in which whether the data read out from the journal memory 13 is the END key code is checked, and if "NO" yields, the operation is returned to the step S181.

If it is determined in the step S187 that the read-out data is the END key code, a step S188 is executed, in which the data for each customer are compiled. More particularly, the individual department data are re-arranged in the order of the department numbers, the PLU data are re-arranged in the order of the PLU numbers, and the data of the same kind are re-arranged in the order of reducing sales data amounts. Also, the data of the same kind and same amount are converted to the sale amount and quantity data. Further, such editing as re-arranging data in the order of time zones or for the individual clerks-in-charge or extracting only the designated data, if necessary, is made. At this time, the individual edited data are stored in vacant areas of the journal memory 13. Thereafter, a step S189 is executed, in which the edited data stored in the journal memory 13 are transferred to the printing buffer PB and printed in the printing section 16, and the operation is returned to the step S181.

If it is determined in the step S183 that the key code read out from the journal memory 13 contains an END key code, a step S190 is executed. In the step S190, the classified data stored in the total amount memory are totaled and printed. Then, a step S191 is executed, in which the data stored in the total amount memory 14 and journal memory 13 are cleared.

While in the above embodiment the journal memory 13 is removably connected to the electronic cash register, it may be permanently secured to the electronic cash register.

Further, while in the above embodiment the key codes are successively stored in the journal memory 13 as they are keyed in, it is also possible to let the amount data obtained after the relevant calculations be stored. Also, data coupled through an OCR or an OMR can be treated in the same way as the data coupled by the keying operation.

Further, while in the above embodiment the printing data is provided at the time of the inspection or clearing, it may also be provided to a data collector or the like.

Now, a further embodiment, in which while input data are successively stored, separation mark codes (i.e., MARK * codes) are also stored at the time of the operation of the separation mark key so that at least particular data between two consecutive separation mark codes, for instance bargain sales data, may be read out for checking at the time of reading of data, will be described.

Figures 25, 26:
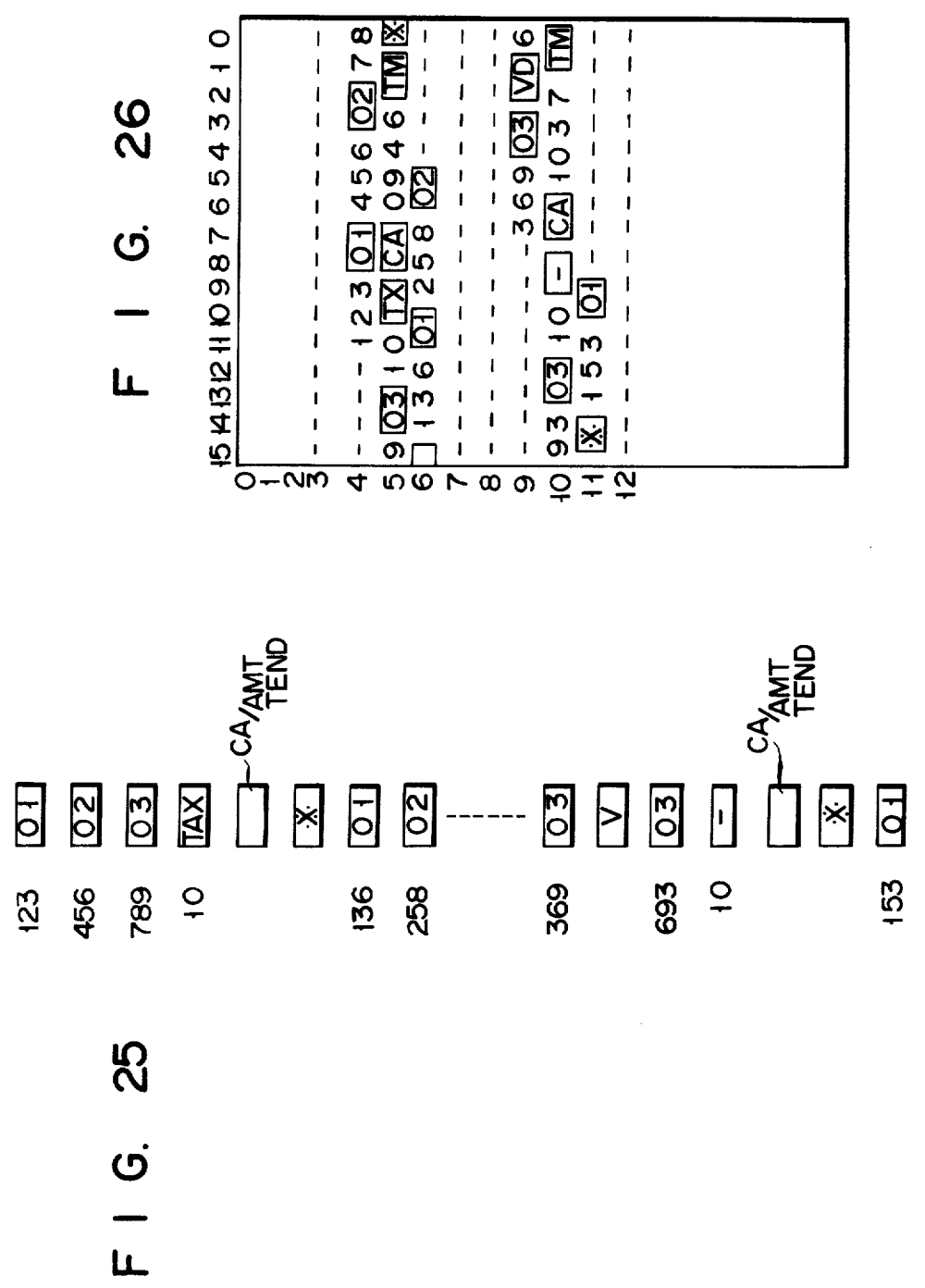

The case when key operation as shown in FIG. 25 is made in the "REG" mode will be described. With the successive operation of the amount keys for "123", . . . , and CA/AMT TEND key, data corresponding to these operated keys are successively stored in the journal memory 13 after the last data previously keyed in, namely in row 4, column 11 through row 5, column 7, as shown in FIG. 26. After these data for one customer are stored, data "0946" showing the present time "9:46" and time code "TIME" are stored. At this time, processing of the input data is done according to the operation of given keys, and a receipt with necessary data printed on a recording sheet in the printing section 4 is issued.

If it is desired to separately provide data previously keyed in and the data to be subsequently keyed in, the MARK * key is operated. As a result, the code "*" is written in the journal memory 13 in location after that of the time code mentioned above. Subsequently, with the operation of the amount keys "136", . . . , and CA/AMT TEND key, the corresponding key codes are successively stored in the journal memory 13 in the row 6, column 14 through row 10, column 6, and then the time data and time code are stored. Now, if it is desired to separately provide data to be keyed in from the data keyed in after the previous operation of the MARK * key, the MARK * key is operated again. As a result, the code "*" is written in the journal memory 13, and then key codes corresponding to the key operation are successively stored in the journal memory 13.

Figure 27:
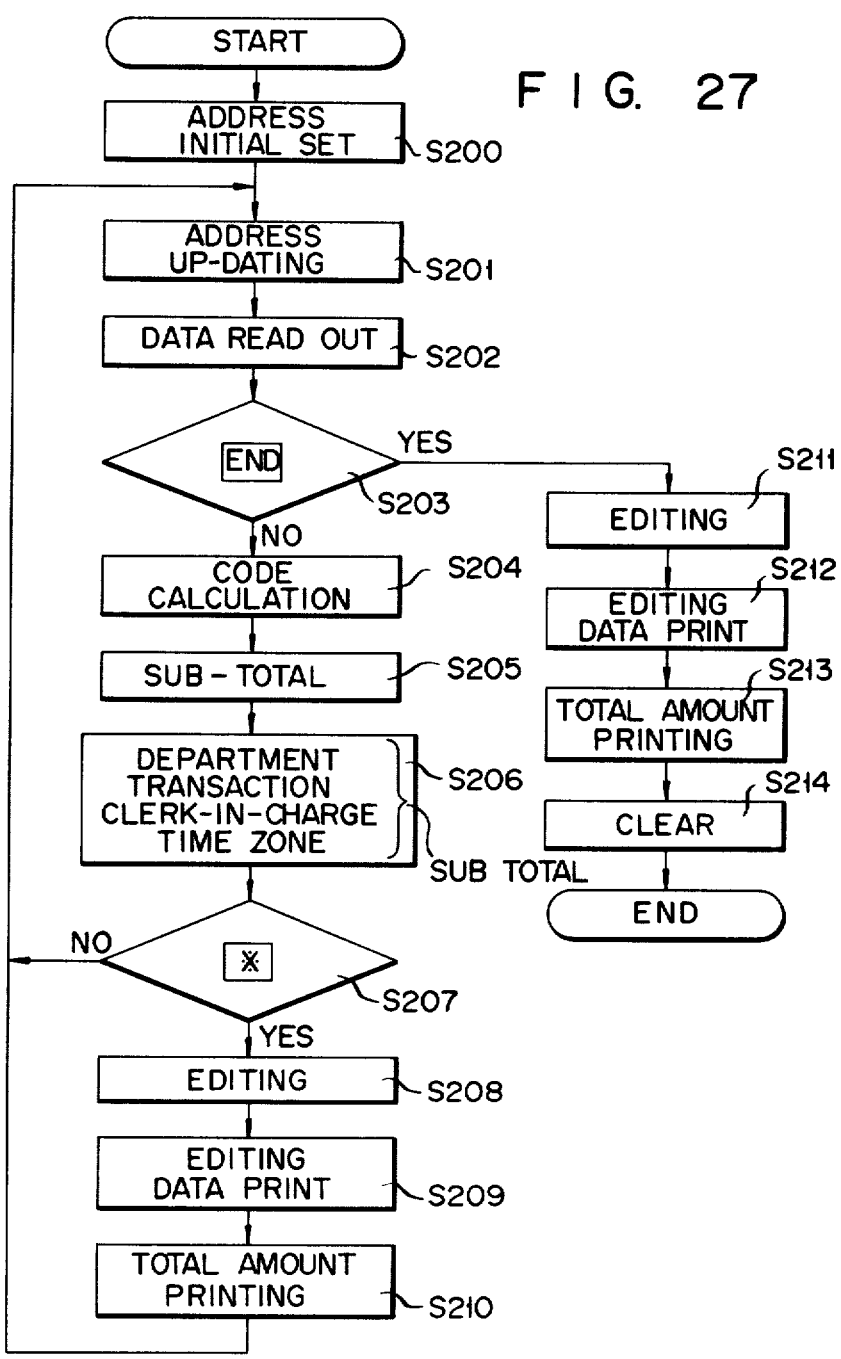
FIG. 27 is a view showing a flow chart illustrating an operation, which takes place with the keying operation as shown in FIG. 25 and in which only the sales data in a bargain sale time zone are checked.

When clearing the journal memory 13 in which data have been stored in the above manner, the MARK * key and then CA/AMT TEND key are operated with the mode switch set to the "Z" mode. As a result, in the step S72 of FIG. 9 an operation as shown by the flow chart of FIG. 27 takes place. In the first place, a step S200 is executed, in which the IX register of the CPU 9 is initialized and, as a result, address initialization for the journal memory 13 is made. Then, a step S201 is executed, in which the index data in the IX register is renewed and, as a result, the designated address in the journal memory 13 is updated. Then, a step S202 is executed, in which the data stored in the memory area of the journal memory 13 designated by the index data in the IX register is read out. Then, a step S203 is executed, in which whether the data read out from the journal memory 13 is the END key code indicating the end of writing of data is checked, and if "NO" yields, a step S204 is executed. In the step S204, calculations according to individual read-out codes are made; for example, a change is calculated if there is an amount data before a code "CA/AMT TEND", addition of tax is made if there is a tax code "TX", and further, price reduction, addition, discount and premium calculations are made. Then, a step S205 is executed, in which the read-out sales data are sub-totaled and the resultant sub-total data are stored in a predetermined register in the CPU 9. Then, a step S206 is executed, in which the calculated data are classified for the individual departments, transactions, clerks-in-charge and time zones and accumulated in the corresponding memory areas in the total amount memory 14. Then, a step S207 is executed, in which whether the data read out from the journal memory 13 is the MARK * code is executed, and if "NO" yields, the operation is returned to the step S201.

If it is judged in the step S201 that the data read out is the MARK * key code, a step S208 is executed, in which the data read out so far are re-read out and compiled. More particularly, the individual department data are re-arranged in the order of the department numbers, the PLU data are re-arranged in the order of the PLU numbers, the sales data are arranged in the order of reducing amounts, and the data of the same kind and same amount are converted to the sale amount and quantity data. Further, such editing as re-arranging data in the order of time zones or for the individual clerks-in-charge or extracting only the designated data, if necessary, is made. Thereafter, a step S209 is executed, in which the edited data stored in the journal memory 13 are transferred to the printing buffer PB for printing in the printing section 16. Then, a step S210 is executed, in which the total of the data read out so far and stored in the total amount memory 14 are totaled and the result is printed on the recording sheet, and the operation is then returned to the step S201.

If it is judged in the step S203 that the read-out data is the END key code, a step S211 is executed. In the step S211, the data read out since the reading-out of the previous MARK * key code are edited. Then, a step S212 is executed, in which are edited data are printed on the recording sheet in the printing section 16. Then, a step S213 is executed, in which the total amount data stored in the total amount memory 14 is printed on the aforementioned recording sheet. Then, a step S214 is executed, in which the data stored in the total amount memory 14 and journal memory 13 are cleared, thus bringing an end to the clearing operation.

In case when the MARK * key is operated twice during the period from the start till the end of the keying operation, that is, when the data stored in the journal memory 13 is divided into three data groups, with the start of the clearing operation the step S200 is executed, and then the steps S201 through S207 are repeatedly executed. Then, with the detection of the MARK * code for the first time, the steps S208 through S210 are executed, whereby the relevant data group is edited and recorded on the printing sheet together with its total. Then, the steps S201 through S207 are executed, whereby data are successively read out for carrying out code calculations and totaling, and with the detection of the MARK * key for the second time, the steps S208 through S210 are executed, whereby the group of data that are coupled from the first operation of the MARK * key till the second operation thereof are edited and recorded on the aforementioned recording sheet together with the total amount. Then, the steps S201 through S207 are repeatedly executed, and with the detection of the END key code the steps S211 through S214 are executed, whereby the group of data keyed in after the second operation of the MARK * key are edited and printed on the recording sheet together with the total amount.

While in the above embodiment the data group having been read out has been edited every time a MARK * key is read out, this is by no means limitative, and it is possible to permit edition of only the data stored in the journal memory 13 between two consequent operations of an edition key. Further, the edition of the read-out data groups may not be effected.

Further, while in the above embodiment only a single MARK * key has been provided as a designation key, it is also possible to provide a plurality of separation mark keys so that codes corresponding to given separation mark keys provided as these keys are operated may be stored in the journal memory 13 and that the data between consecutive separation mark keys may be read out.

Further, while in the above embodiment key code data are stored in the journal memory 13 as they are keyed in, it is also possible to let the data obtained after the processing of the input data according to the operation of given keys such as change data be stored in the journal memory 13 as well.

Further, while the above embodiment is concerned with an electronic cash register, the invention can also be applied to other electronic apparatus where data are successively coupled by a keying operation.

What is claimed is:

1. An electronic cash register comprising:
    a keyboard having at least amount keys, department keys, function keys and transaction keys;
    first memory means connected to said keyboard, for sequentially storing key code data corresponding to all of the operated keyboard keys in the sequence of key operation, the key code data including data on the type of key operated, said key operated being one of department keys, function keys and transaction keys, and sales data input by the operation of each of the amount keys at the time of input designation during inputting of sales data;
    a central processing unit having a second memory means and being connected to said keyboard and to said first memory means, said central processing unit including:
        means for storing in said second memory means designated read out data input by the operation of any one of at least department keys, function keys and transaction keys on said keyboard; and
        means for judging whether all the key code data sequentially read out from said first memory means, at the time of read out of said key code data from said first memory means, coincides with the data shown by said designated read out data which is stored in said second memory means; and printing means connected to said central processing unit for sequentially printing input sales data on a receipt at the time said sales data is input by operation of said keyboard; and at the time of read out of said key code data from said first memory means, for sequentially printing only the data which is judged by said judging means of said central processing unit to coincide with said designated read out data which is stored in said second memory means.

2. The electronic cash register of claim 1, wherein:
a time measuring circuit is provided for measuring at least the hours and minutes of the present time at least every minute; and
said first memory means, at the time of said input designation and in response to the operation of at least one of said transaction keys, storing the key code corresponding to at least one of said transaction keys, and at the time of operation of at least one of said transaction keys, also storing present time data read out from said time measuring circuit.

3. The electronic cash register of claim 1, wherein:
said keyboard includes a mode switch for designating a plurality of operation modes, including registering and refunding modes;
said first memory means further stores, in the sequence of operation, mode data designated in response to the operation of said mode switch at the time of said input designation, the mode data being stored in said second memory means corresponding to the operation of said mode switch;
said judging means of said central processing unit judges whether data indicating the mode stored in said second memory coincides with any of the key code data read out sequentially from said first memory means when the read out of said first memory means is designated; and
said printing means prints only the data coinciding with the mode data in said second memory means of the key code data read out in sequence from said first memory means when the read out of said first memory means is designated.

4. The electronic cash register of claim 1, wherein:
said keyboard includes a clerk-in-charge key for designating one of a plurality of clerks;
said first memory means further stores, in the sequence of operation, clerk data specified in response to the operation of said clerk-in-charge key at the time of input designation, clerk data being stored in said second memory means in correspondence to said operated clerk-in-charge key;
said judging means of said central processing unit judges whether the clerk data stored in said second memory means coincides with any of the key code data read out sequentially from said first memory means when the read out of said first means is designated; and
said printing means prints only the data coinciding with the clerk data stored in said second memory means of the key code data read out in sequence from said first memory means when the read out of said first memory means is designated.

* * * * *